United States Patent
Bogolea et al.

(10) Patent No.: US 12,548,345 B2
(45) Date of Patent: Feb. 10, 2026

(54) METHOD FOR AUTONOMOUS PRODUCT DETECTION AND RECOGNITION ON INVENTORY STRUCTURES WITHIN A STORE

(71) Applicant: Simbe Robotics, Inc., South San Francisco, CA (US)

(72) Inventors: Bradley Bogolea, South San Francisco, CA (US); Jariullah Safi, South San Francisco, CA (US); Kanchan Bahirat, South San Francisco, CA (US)

(73) Assignee: Simbe Robotics, Inc., Burlingame, CA (US)

( * ) Notice: Subject to any disclaimer, the term of this patent is extended or adjusted under 35 U.S.C. 154(b) by 0 days.

(21) Appl. No.: 19/217,166

(22) Filed: May 23, 2025

(65) Prior Publication Data

US 2025/0363807 A1 Nov. 27, 2025

Related U.S. Application Data

(60) Provisional application No. 63/651,260, filed on May 23, 2024.

(51) Int. Cl.
*G06V 20/56* (2022.01)
*B65G 1/04* (2006.01)
*G01S 17/89* (2020.01)
*G06Q 10/087* (2023.01)
*G06V 10/40* (2022.01)
(Continued)

(52) U.S. Cl.
CPC ............... *G06V 20/56* (2022.01); *B65G 1/04* (2013.01); *G01S 17/89* (2013.01); *G06Q 10/087* (2013.01); *G06V 10/40* (2022.01); *G06V 10/751* (2022.01); *G06V 10/761* (2022.01); *G06V 10/762* (2022.01)

(58) Field of Classification Search
CPC ............... G05D 1/0246; G05D 1/0274; G05D 1/0282; G05D 1/223; G05D 1/225; G05D 1/229; G05D 1/243; G05D 1/246; G05D 1/249; G05D 1/6987; G05D 2105/93; G05D 2107/67; G05D 2109/10; G05D 2111/10; G06F 18/21; G06F 18/22; G06Q 10/087;
(Continued)

(56) References Cited

U.S. PATENT DOCUMENTS

2008/0077511 A1* 3/2008 Zimmerman ........ G06Q 10/087
                                                    705/28
2020/0286032 A1* 9/2020 Bogolea ............... G05D 1/0282

* cited by examiner

*Primary Examiner* — Manuchehr Rahmjoo
(74) *Attorney, Agent, or Firm* — Run8 Patent Group, LLC; Peter Miller; Leah Raddatz

(57) ABSTRACT

One variation of a method includes: accessing an image of an inventory structure captured by a robotic system navigating within a facility; detecting an object occupying a slot in the inventory structure depicted in the image; extracting a set of visual features from the image; representing the set of visual features in a vector; projecting the vector into a multi-dimensional space populated template vectors representing product units of verified product types within the facility; calculating a similarity score between the set of visual features and template visual features represented in a cluster of template vectors in the multi-dimensional space, based on proximity between the vector and the cluster of template vectors; and, in response to the similarity score exceeding a threshold score, identifying the object as a product unit of a first product type affiliated with a first product identifier associated with the cluster of template vectors.

14 Claims, 9 Drawing Sheets

(51) Int. Cl.
 *G06V 10/74* (2022.01)
 *G06V 10/75* (2022.01)
 *G06V 10/762* (2022.01)
(58) Field of Classification Search
 CPC .... G06V 10/751; G06V 10/987; G06V 20/52; G06V 2201/06
 See application file for complete search history.

METHOD FOR AUTONOMOUS PRODUCT DETECTION AND RECOGNITION ON INVENTORY STRUCTURES WITHIN A STORE

CROSS-REFERENCE TO RELATED APPLICATIONS

This Application claims the benefit of U.S. Provisional Application No. 63/651,260, filed on 23 May 2024, which is incorporated in its entirety by this reference.

TECHNICAL FIELD

This invention relates generally to the field of stock tracking and, more specifically, to a new and useful method for autonomous product detection and recognition on inventory structures within a store in the field of stock tracking.

DESCRIPTION OF THE EMBODIMENTS

Figure 1:
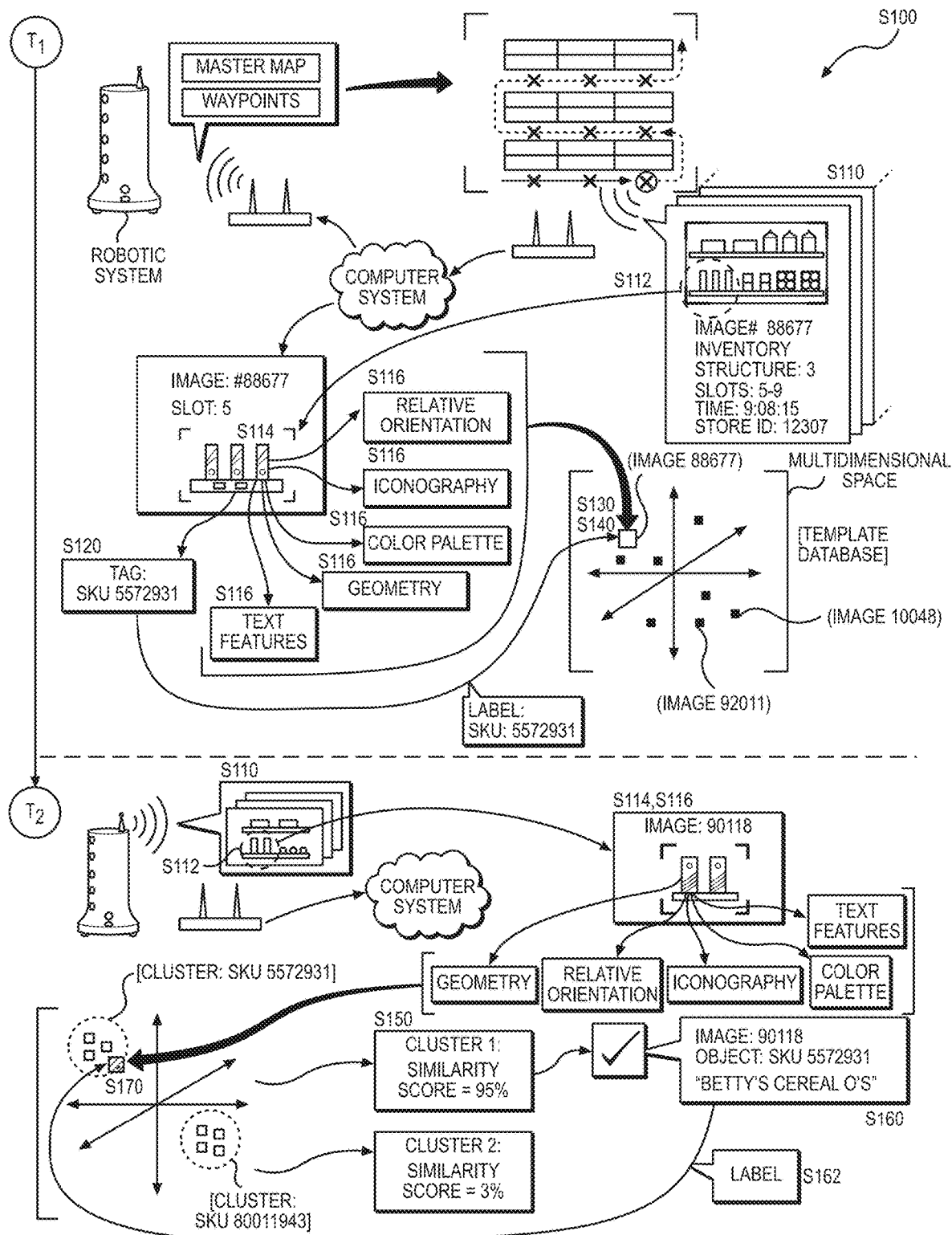
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-3, 4A, 4B, and 5-8, a method S100 includes, during a first time period: accessing a first image, in a set of images, of a first inventory structure captured by a robotic system while navigating within a facility in Block S110; detecting a first slot, in a set of slots, on the first inventory structure, depicted in the first image in Block S112; detecting a first product unit occupying the first slot depicted in a first region of the first image in Block S114; extracting a first set of visual features from the first region of the first image, the first set of visual features representing the first product unit in Block S116; detecting a first tag, proximal the first slot, in a second region of the first image in Block S120; identifying a first product identifier of a first product type of the first product unit based on features detected in the second region of the first image in Block S122; representing the first set of visual features in a first template vector in a set of template vectors in Block S130; labeling the first template vector with the first product identifier; and populating a multi-dimensional space with the set of template vectors representing verified products within the facility in Block S140.

The method S100 further includes, during a second time period succeeding the first time period: accessing a second image of a second inventory structure captured by the robotic system in Block S110; detecting a second slot on the second inventory structure depicted in the second image in Block S112; detecting an object arranged in the second slot of the second inventory structure in the second image in Block S114; extracting a second set of visual features from the second image, the second set of visual features representing a packaging profile of the object in Block S116; representing the second set of visual features in a vector in Block S130; and, in response to the vector approximating a first cluster of template vectors in the multi-dimensional space, calculating a first similarity score between the second set of visual features represented in the vector and template visual features represented in the first cluster of template vectors in Block S150. The method S100 further includes, in response to the first similarity score exceeding a threshold score: identifying the object as a product unit of a second product type affiliated with a second product identifier associated with the first cluster of template vectors in Block S160; assigning the second product identifier to the vector in Block S162; and storing the vector in the multi-dimensional space in Block S170.

One variation of the method S100 includes, at a first time: accessing an image, in a set of images, of a shelving structure captured by a mobile robotic system while navigating within a store in Block S110; detecting a slot, in a set of slots, on the shelving structure, depicted in the image in Block S112; detecting a product unit occupying the slot depicted in a first region of the image in Block S114; extracting a first set of visual features, representing the product unit, from the region of the image in Block S116; detecting a tag, proximal the slot, in a second region of the image in Block S120; identifying a product identifier of a product type of the product unit based on features detected in the second region of the image in Block S122; representing the first set of visual features in a template vector, in a set of template vectors, in Block S130; labeling the template vector with the product identifier; and populating a multi-dimensional space with the set of template vectors representing verified products within the store in Block S140.

The method S100 further includes, at a second time: accessing a second image of an inventory structure captured by the mobile robotic system during a scan cycle in Block S110; detecting an object arranged on a shelf of the inventory structure in the second image in Block S114; extracting a second set of visual features, representing a packaging profile of the object, from the second image in Block S116; generating a vector representing the second set of visual features in Block S130; and, in response to the vector approximating a cluster of template vectors in the multi-dimensional space, calculating a similarity score between the second set of visual features represented in the vector and template visual features represented in the cluster of template vectors in Block S150.

The method S100 also includes, in response to the similarity score exceeding a threshold score: identifying the object as a product unit of a second product type affiliated with a second product identifier associated with the cluster of template vectors in Block S160; assigning the second product identifier to the vector in Block S162; and storing the vector in the multi-dimensional space in Block S170.

One variation of the method S100 includes: accessing a first image of a first inventory structure captured by a robotic system while navigating within a facility in Block S110; detecting a first slot, in a first set of slots, on the first inventory structure, depicted in the first image in Block S112; detecting a first object occupying the first slot depicted in a first region of the first image in Block S114; extracting a first set of visual features from the first region of the first image, the first set of visual features representing the first object in Block S116; representing the first set of visual features in a first vector in Block S130; projecting the first vector into a multi-dimensional space populated with a corpus of template vectors representing product units of verified product types within the facility in Block S140; and calculating a first similarity score between the first set of visual features represented in the first vector and template visual features represented in a first cluster of template vectors, in the corpus of template vectors based on proximity between the first vector and the first cluster of template vectors in the multi-dimensional space in Block S150. In this variation, the method S100 further includes, in response to the first similarity score exceeding a threshold score: identifying the first object as a first product unit of a first product type affiliated with a first product identifier associated with the first cluster of template vectors in Block S160; assigning the first product identifier to the first vector in Block S162; and storing the first vector in the multi-dimensional space in Block S170.

1.1 Method: Absence of Match

Figure 7:
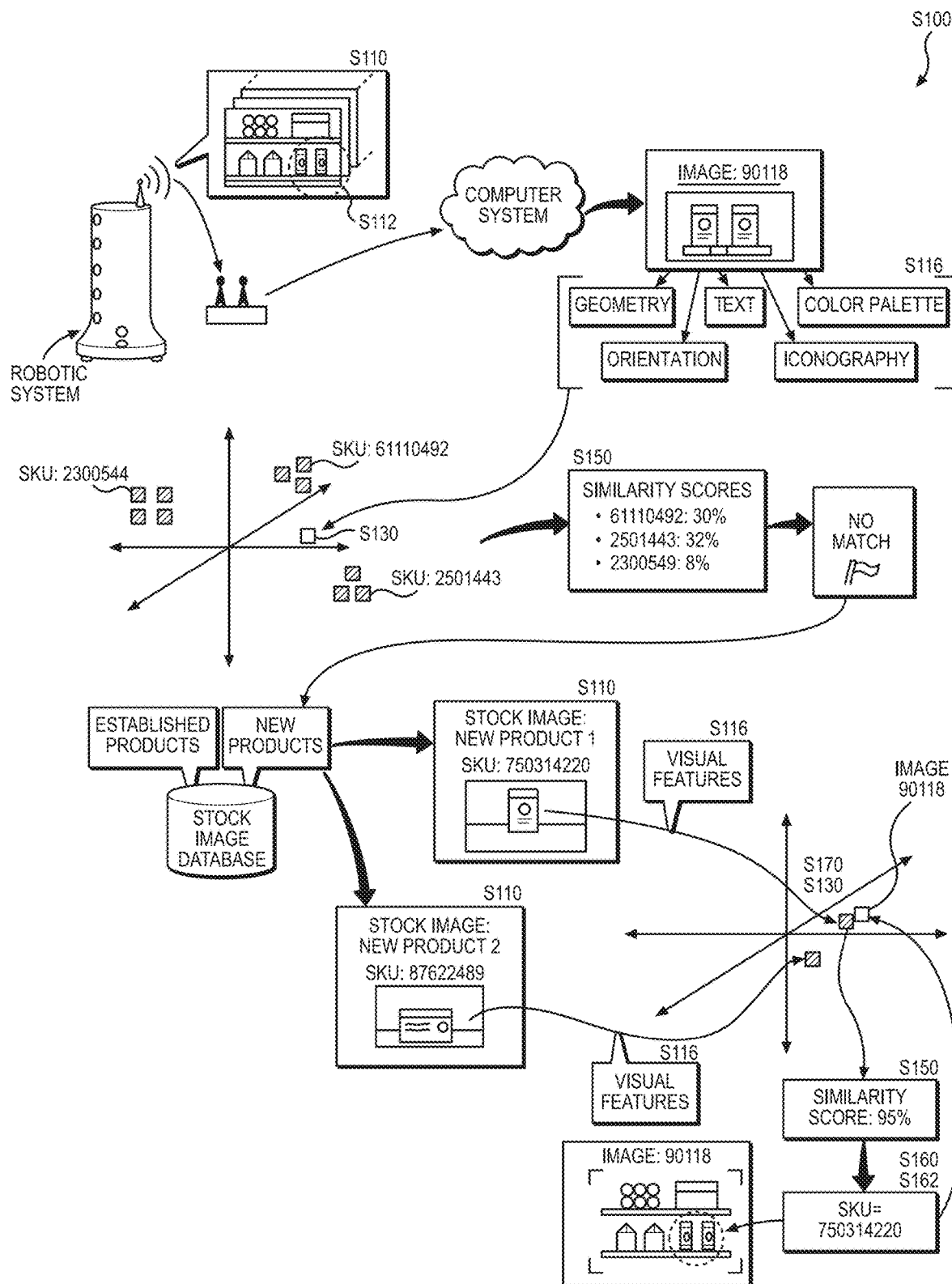
FIG. 7 is a schematic representation of one variation of the method.

As shown in FIG. 7, one variation of the method S100 includes: accessing a first image of a first inventory structure captured by a robotic system while navigating within a facility in Block S110; detecting a first slot, in a first set of slots, on the first inventory structure, depicted in the first image in Block S112; detecting a first object occupying the first slot depicted in a first region of the first image in Block S114; extracting a first set of visual features from the first region of the first image, the first set of visual features representing the first object in Block S116; detecting a first tag, proximal the first slot, in a second region of the first image in Block S120; representing the first set of visual features in a first vector in Block S130; projecting the first vector into a multi-dimensional space populated with a corpus of template vectors representing product units of verified product types within the facility in Block S140; and, for each cluster of template vectors, in the corpus of template vectors, in the multi-dimensional space, calculating a similarity score, in a set of similarity scores, between the first set of visual features represented in the first vector and template visual features represented in the cluster of template vectors based on proximity between the first vector and the cluster of template vectors in the multi-dimensional space in Block S150.

In this variation, the method S100 further includes, in response to each similarity score, in the set of similarity scores, falling below a threshold score: accessing a stock image database including a set of stock images of a set of new product types associated with the facility in Block S180; for a first stock image, in the set of stock images, depicting a second product unit of a second product type, in the set of new product types, associated with a second product identifier, extracting a second set of visual features from the first stock image, the second set of visual features representing a packaging profile of the second product unit in Block S116; representing the second set of visual features in a second vector in Block S130; and calculating a second similarity score between the second set of visual features represented in the second vector and the first set of visual features represented in the first vector based on proximity between the second set of visual features and the first set of visual features in the multi-dimensional space in Block S150. The method S100 further includes, in response to the second similarity score exceeding the threshold score: identifying the first object as a first product unit of the second product type affiliated with the second product identifier in Block S160; assigning the second product identifier to the first vector in Block S162; storing the first vector in the multi-dimensional space in Block S170; and storing the second vector in the multi-dimensional space in Block S170.

2. Applications

Generally, the method S100 can be executed by a computer system (e.g., a remote computer system, a remote server): to autonomously construct, maintain, and update, a corpus of template representations of real product units—of identified product types—stocked on inventory structures within a store based on real images captured by a mobile robotic system and/or fixed cameras arranged in the store; and to identify subsequent product units of these product types based on this corpus of template representations and subsequent images of these inventory structures captured by the mobile robotic system and/or fixed cameras.

In particular, the computer system can execute Blocks of the method S100: to dispatch a mobile robotic system to capture a set of images of real product units (e.g., verified product units) occupying slots arranged on a shelving structure within a retail space (e.g., a grocery store, a warehouse) during a scan cycle; to represent these real product units as multi-dimensional (e.g., an "n-dimensional") template vectors embodying multiple (e.g., "n-number" of) visual features detected and extracted from a corresponding image, in the set of images; to label each template vector with a product identifier (e.g., a global trade item number) extracted from a tag, proximal each product unit, depicted in a corresponding image; and to generate a template database (or "multi-dimensional space") storing many (e.g., thousands, millions) template vectors representative of each real product associated with the retail space.

More specifically, the computer system can implement structured data analysis techniques (e.g., linear regression analysis, cluster analysis, k-means clustering, and/or other statistical analysis and machine learning techniques) to partition the set of template vectors—each uniquely representing multiple features of one real product unit—into multiple groups or "clusters" of vectors representing similar combinations of features and/or similar feature ranges (e.g., a packaging profile, a color palette, text features, iconography features, a dimension, a geometry, a relative orientation, a relative position, or a lighting condition) in one or more dimensions in the multi-dimensional space. The multi-dimensional space can further store: vector representations of images depicting each product unit in various lighting conditions; vector representations of images depicting damaged packaging of each product unit; and/or vector representations of images depicting packaging orientations of each product unit. The computer system can thus maintain a database of vector representations of real images depicting real product units, of identified product types, stocked on inventory structures within a store.

The computer system can further execute Blocks of the method S100 to process images of objects arranged on inventory structures and identify a particular product type of each object without paper tags, promotional tags, or electronic shelf labels specifying a product identifier. For example, the computer system can: access an image captured by the mobile robotic system during a scan cycle; automatically extract visual features—such as a packaging profile, a color palette, text features, iconography features, a dimension, a geometry, a relative orientation, and/or a relative position—of an object depicted in the image; and positively identify a product type of the object based on proximity of these visual features of the object to template features within a cluster of template vectors represented in the multi-dimensional space.

Accordingly, the computer system can verify that these visual features correspond to template features within the cluster of template vectors in the multi-dimensional space by: detecting a vector representing visual features of the new object intersecting or proximal a cluster of template vectors within the multi-dimensional space; calculating a similarity score representing similarity between visual features associated with the new object and visual features represented by the cluster of template vectors; and automatically identifying the new object as a verified product unit of a product type associated with the cluster of template vectors if this similarity score exceeds a threshold score.

Additionally, the computer system can process images received from the mobile robotic system to generate a graph, map, or table of current product placement on inventory structures in the store and/or to generate a task list of misplaced or misoriented products to correct, and the computer system can present this graph, map, table, and/or task list to employees upon their arrival at the retail store the next morning prior to the retail store opens. Alternatively, the computer system can dispatch the mobile robotic system to capture images while navigating through the store during store hours and process images received from the mobile robotic system substantially in real-time to generate graphs, maps, tables, and/or task lists in near-real-time.

Furthermore, the computer system can: access an image captured by the mobile robotic system during a scan cycle; automatically extract visual features—such as a packaging profile, a color palette, text features, iconography features, a dimension, a geometry, a relative orientation, and/or a relative position—of an object depicted in the image; and attempt to match these visual features of the object to template features represented by the set of template vectors in the multi-dimensional space. In response to detecting absence of a match between visual features of the object and template features, the computer system can: expand the search to stock images of new product types (i.e., new SKUs or similar SKUs with new packaging); and attempt to match the visual features of the object to features of new product types detected in these stock images. Then, in response to detecting a match between the visual features of the object and features detected in a stock image, the computer system can: positively identify the object as a verified product unit of a new product type associated with the stock image; generate a template vector for the object labeled with the new product type; and store the template vector and the stock image in the multi-dimensional space. The computer system can further expand a cluster of template vectors proximal this template vector over time in order to replace stock images represented by the cluster of template vectors with images of real product units (e.g., verified product units).

Therefore, the computer system can execute Blocks of the method S100 to autonomously generate and update a corpus of template representations of real product units—of identified product types—stocked on inventory structures within a store under real lighting conditions based on real images captured by a mobile robotic system and/or fixed cameras arranged in the store in order to reduce differences between an object depiction in a new image and template images depicting product units of the same type. Thus, the computer system can execute Blocks of the method S100 to filter a relatively large multi-dimensional space (e.g., thousands, millions) of template vectors—representing visual features and digital photographic images of real product units—to a limited cluster of template vectors exhibiting a greatest similarity to visual features of a subsequent object and to positively identify the object as a real product unit of a product type associated with the cluster of template vectors.

3. Robotic System

Figure 3:
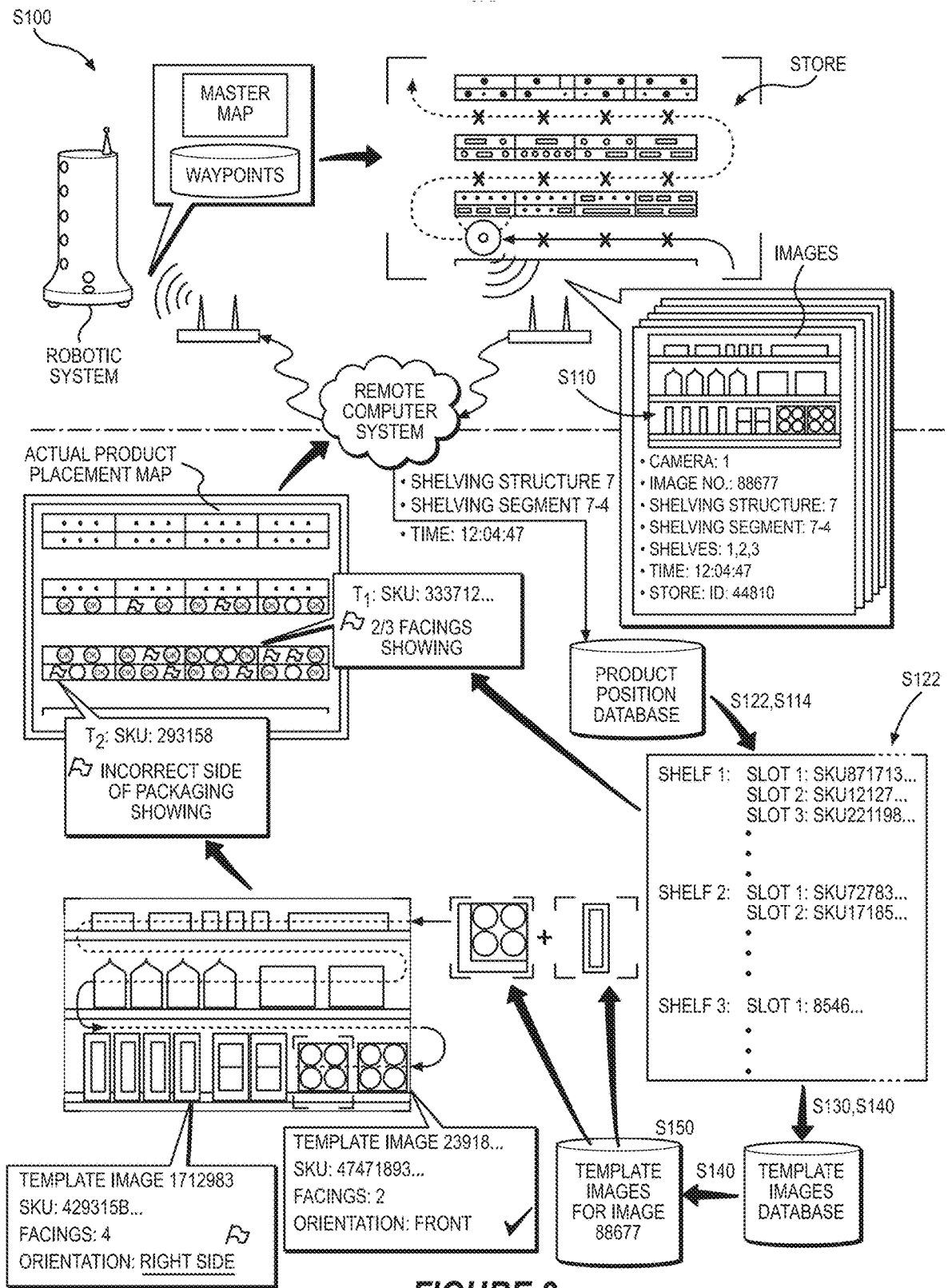
FIG. 3 is a flowchart representation of one variation of the method.
Figure 8:
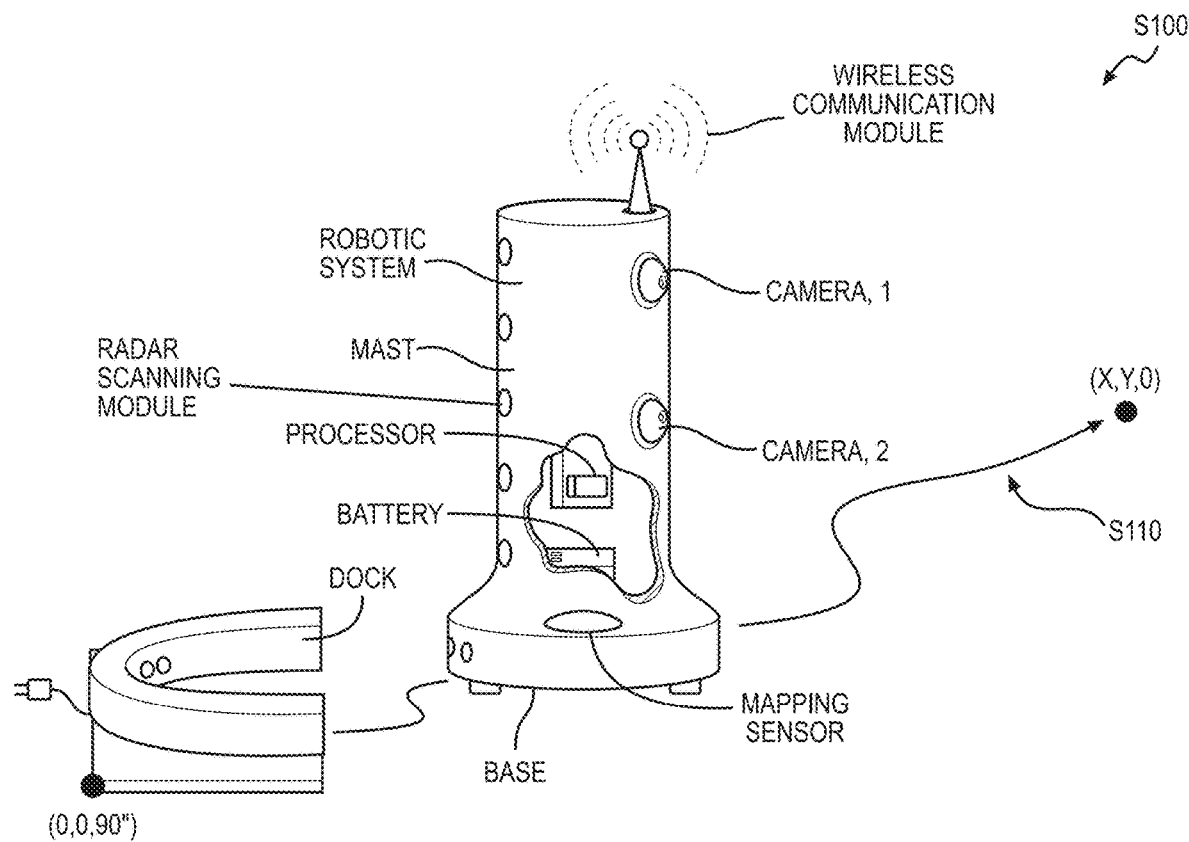
FIG. 8 is a schematic representation of one variation of the method.

As shown in FIGS. 3 and 8, a mobile robotic system autonomously navigates throughout a store and records images—such as photographic images of packaged goods and/or depth images of inventory structures—continuously or at discrete predefined waypoints throughout the store during a scan cycle. Generally, the mobile robotic system can define a network-enabled mobile robot configured to autonomously: traverse a store; capture photographic (e.g., color, black-and-white) and/or depth images of shelving structures, shelving segments, shelves, slots, or other inventory structures within the store; and upload those images to the computer system for analysis, as described below.

Figure 2:
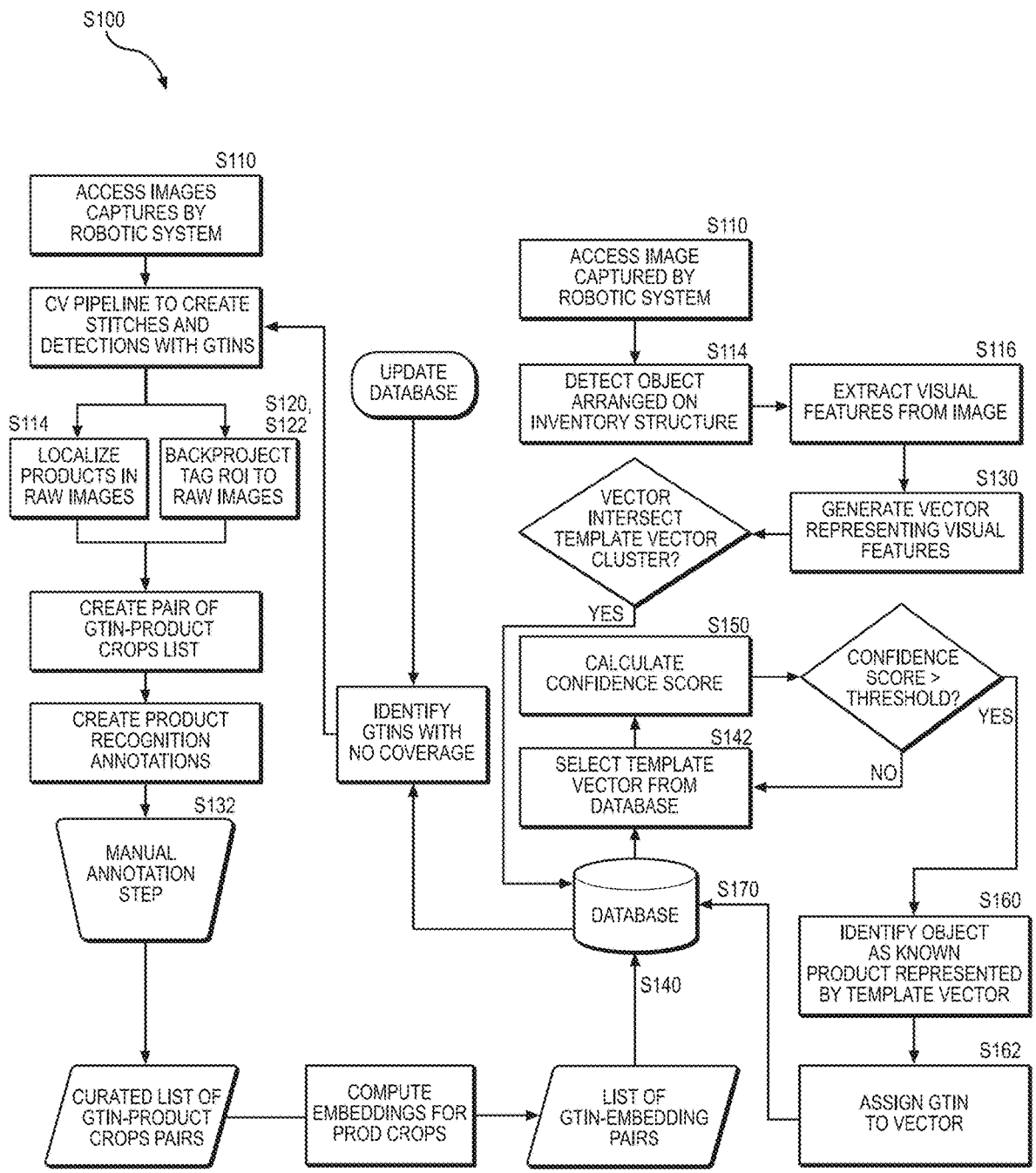
FIG. 2 is a flowchart representation of one variation of the method.

In one implementation, the mobile robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems configured to generate depth images); a processor that transforms data collected by the mapping sensors into two- or three-dimensional maps of a space around the mobile robotic system; a mast extending vertically from the base; a set of photographic cameras arranged on the mast; and a wireless communication module that downloads waypoints and a master map of a store from a computer system (e.g., a remote server) and that uploads photographic images captured by the photographic camera and maps generated by the processor to the computer system, as shown in FIG. 3. In this implementation, the mobile robotic system can include photographic cameras mounted statically to the mast, such as a first vertical array of (e.g., two, six) photographic cameras on a left side of the mast and a second vertical array of photographic cameras on the right side of the mast, as shown in FIG. 2. The mobile robotic system can additionally or alternatively include articulable photographic cameras, such as: one photographic camera on the left side of the mast and supported by a first vertical scanning actuator; and one photographic camera on the right side of the mast and supported by a second vertical scanning actuator. The mobile robotic system can also include a zoom lens, a wide-angle lens, or any other type of lens on each photographic camera. However, the mobile robotic system can define any other form and can include any other subsystems or elements supporting autonomous navigation and image capture throughout a store environment.

Furthermore, multiple robotic systems can be deployed in a single store and can be configured to cooperate to image shelves and product units within the store. For example, two robotic systems can be deployed to a large single-floor retail store and can cooperate to collect images of all shelves and inventory structures in the store within a threshold period of time (e.g., within one hour). In another example, one robotic system is deployed on each floor of a multi-floor store, and each robotic system collects images of shelves and inventory structures on its corresponding floor. The computer system can then aggregate photographic and/or depth images captured by these robotic systems deployed in this store to generate a graph, map, table, and/or task list for managing distribution and restocking of product throughout the store.

4. Hierarchy and Terms

A "store" is referred to herein as a (static or mobile) facility containing one or more inventory structures.

A "product" is referred to herein as a type of loose or packaged good associated with a particular product identifier (e.g., a SKU) and representing a particular class, type, and varietal. A "unit" or "product unit" is referred to herein as an instance of a product—such as one bottle of detergent, one box of cereal, or package of bottled water—associated with one SKU value.

A "product facing" is referred to herein as a side of a product designated for a slot.

A "slot" is referred to herein as a section (or a "bin") of a shelf on an "inventory structure" designated for storing and displaying product units of the product type (i.e., of the same SKU or CPU). An inventory structure can include a shelving segment, a shelving structure, or other product display containing one or more slots on one or more shelves.

A "planogram" is referred to herein as a plan or layout designating display and stocking of multiple product facings across multiple slots, such as: in a particular shelving segment; across a particular shelving structure; across multiple shelving structures within a particular aisle; across multiple aisles in the store; or throughout the entirety of the store. In particular, the planogram can specify a target product type, a target product placement, a target product quantity, a target product quality (e.g., ripeness, time to peak ripeness, maximum bruising), and/or a target product orientation for a fully-stocked slot for each slot represented in the planogram. For example, the planogram can define a graphical representation of an inventory structure in the store, including graphical representations of each slot in this inventory structure, each populated with a quantity of graphical representations of a product type assigned to this slot equal to a quantity of product facings assigned to this slot. Alternatively, the planogram can record textual product placement for one or more inventory structures in the store in the form of a spreadsheet, slot index, or other database.

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on photographic images and/or other data recorded by the mobile robotic system while autonomously executing scan cycles in the store.

The method S100 is described herein as executed by a computer system (e.g., a remote server, a computer network) remote from the mobile robotic system. However, Blocks of the method S100 can be executed locally by one or more robotic systems deployed in a retail space (or store, warehouse, etc.), by a local computer system (e.g., a local server), or by any other computer system.

Furthermore, Blocks of the method S100 are described below as executed by the computer system to identify products, to identify electronic shelf labels, and to verify product data displayed on these electronic shelf labels on open shelves in shelving structures within a grocery store. However, the computer system can implement similar methods and techniques to identify products, to identify electronic shelf labels, and to verify product data displayed on these electronic shelf labels on cubbies, in a refrigeration unit, on a wall rack, on a freestanding floor rack, on a table, on a hot-food display, or on or in any other product organizer, display, or other inventory structure in a retail space.

5. Robotic System Deployment and Scan Cycle

Generally, the computer system can dispatch the mobile robotic system to autonomously navigate through a store and to record images of inventory structures within the store during a scan cycle. More specifically, the computer system can dispatch the mobile robotic system to autonomously navigate along a preplanned sequence of waypoints or along a dynamic path and to record photographic images and/or depth images of inventory structures throughout the store.

5.1 Scan Cycle: Waypoints

In one implementation, the computer system: defines a set of waypoints specifying target locations within the store through which the mobile robotic system navigates and captures images of inventory structures throughout the store during a scan cycle; and intermittently (e.g., twice per day) dispatches the mobile robotic system to navigate through this sequence of waypoints and to record images of inventory structures nearby during a scan cycle. For example, the mobile robotic system can be installed within a store, and the computer system can dispatch the mobile robotic system to execute a scan cycle during store hours, including navigating to each waypoint throughout the store and collecting data representative of the stock state of the store in near real-time as patrons move, remove, and occasionally return product on, from, and to inventory structures within the store (e.g., shelving structures, refrigeration units, inventory structures, hanging racks, cubbies, etc.). During this scan cycle, the mobile robotic system can: record photographic (e.g., color, black-and-white) images of each inventory structure; record depth images of all or select inventory structures; and upload these photographic and depth images to the computer system, such as in real-time or upon conclusion of the scan cycle. The computer system can then: detect types and quantities of packaged goods stocked in slots on these inventory structures in the store based on data extracted from these photographic and depth images; and aggregate these data into a realogram of the store.

The computer system can therefore maintain, update, and distribute a set of waypoints to the mobile robotic system, wherein each waypoint defines a location within a store at which the mobile robotic system is to capture one or more images from the integrated photographic and depth cameras. In one implementation, the computer system defines an origin of a two-dimensional Cartesian coordinate system for the store at a charging station—for the mobile robotic system—placed in the store, and a waypoint for the store defines a location within the coordinate system, such as a lateral ("x") distance and a longitudinal ("y") distance from the origin. Thus, when executing a waypoint, the mobile robotic system can navigate to (e.g., within three inches of) a (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("ə") relative to the origin of the store, based on an angular position of an aisle or shelving structure in the coordinate system. When executing a waypoint, the mobile robotic system can orient to (e.g., within 1.5° of) the target orientation defined in the waypoint in order to align the suite of photographic and depth cameras to an adjacent shelving structure or inventory structure.

When navigating to a next waypoint, the mobile robotic system can scan its environment with the same or other depth sensor (e.g., a LIDAR sensor, as described above), compile depth scans into a new map of the mobile robotic system's environment, determine its location within the store by comparing the new map to a master map of the store defining the coordinate system of the store, and navigate to a position and orientation within the store at which the output of the depth sensor aligns—within a threshold distance and angle—with a region of the master map corresponding to the (x,y,ə) location and target orientation defined in this next waypoint.

In this implementation, prior to initiating a new scan cycle, the mobile robotic system can download—from the computer system—a set of waypoints, a preferred order for the waypoints, and a master map of the store defining the coordinate system of the store. Once the mobile robotic system leaves its dock at the beginning of a scan cycle, the mobile robotic system can repeatedly sample its integrated depth sensors (e.g., a LIDAR sensor) and construct a new map of its environment based on data collected by the depth sensors. By comparing the new map to the master map, the mobile robotic system can track its location within the store throughout the scan cycle. Furthermore, prior to navigating to a next scheduled waypoint, the mobile robotic system can confirm completion of the current waypoint based on alignment between a region of the master map corresponding to the (x,y,ə) location and target orientation defined in the current waypoint and a current output of the depth sensors, as described above.

However, the mobile robotic system can implement any other methods or techniques to navigate to a position and orientation in the store that falls within a threshold distance and angular offset from a location and target orientation defined by a waypoint.

5.2 Scan Cycle: Dynamic Path

In one implementation, during a scan cycle, the mobile robotic system can autonomously generate a path through the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram. For example, the computer system can dynamically generate a path through the store during a scan cycle to maximize a value of inventory structures or a particular product recorded by the mobile robotic system per unit time responsive to dynamic obstacles within the store (e.g., patrons, spills), such as described in U.S. patent application Ser. No. 15/347,689.

In this implementation, the mobile robotic system can then continuously capture photographic images and/or depth images of inventory structures in the store (e.g., at a rate of 10 Hz, 24 Hz). However, the mobile robotic system can capture images of inventory structures within the store at any other frequency during this scan cycle.

6. Image Access

Generally, the mobile robotic system can return images (e.g., photographic and/or depth images) recorded during a setup period to a remote database, such as in in-real time during the setup period, during scheduled upload time windows within the setup period. The computer system can then access an image of an inventory structure, captured by the mobile robotic system during the scan cycle, from this remote database in Block S110.

In one implementation, the computer system processes individual photographic images according to the method S100 to generate a template database of product units depicted in these individual images in various lighting conditions, relative orientations, and relative positions in order to identify new or unverified product units arranged on a promotional display, an end-cap, and/or an inventory structure, as further described below.

In another implementation, the mobile robotic system can return images (e.g., photographic and/or depth images) recorded during the scan cycle to the remote database, such as in real-time during the scan cycle, upon completion of the scan cycle, or during scheduled upload periods within the scan cycle. The computer system can then access an image of an inventory structure, captured by the mobile robotic system during the scan cycle, from this remote database in Block S110. Further, the computer system can: stitch multiple photographic images into one composite photographic image representing a length of one inventory structure or of multiple adjacent inventory structures; and then process this "composite" photographic image according to methods and techniques described below. Alternatively, the computer system can: stitch multiple depth images into one composite depth image representing the length of one inventory structure or of multiple adjacent inventory structures; and then process this "composite" depth image according to methods and techniques described below.

6.1 Image Segmentation

Upon retrieval of an image, the computer system can "dewarp," "flatten," or otherwise preprocess the image in preparation for detecting and extracting features from the image.

In one implementation, the computer system can implement methods and techniques described in U.S. patent application Ser. No. 17/169,326: to extract features from the image and detect discrete shelf faces or shelves in the image based on these features; to define a set of product regions, each product region depicting product units occupying one shelf in the inventory structure; and to update the realogram with representations of shelf faces and adjacent product regions for this inventory structure.

The computer system can also implement computer vision techniques (e.g., object recognition, edge detection, optical character recognition) to identify a perimeter or a boundary of each product unit within the product region; and then crop the image around each product unit such that only features corresponding to the product unit are extracted from the image and processed.

In one variation, the computer system can: crop an image around an area or volume above a shelf corresponding to a discrete object—in a set of discrete objects—shown in a position on the shelf in the image; and repeat this process for other discrete objects detected in the image to generate a set of discrete image boundaries, each boundary representing one discrete object arranged in a unique location on the shelf.

However, the computer system can access images of any other type and segment these images in any other way.

7. Template Image Database: Multi-Dimensional Space

Generally, the computer system can: access a set of (e.g., 100, 1 k, 100 k, 1 million) images (e.g., digital photographic images) of a retail space recorded by the mobile robotic system during a setup period; segment or crop these images around each product unit depicted in these images; detect a set of features representing visual characteristics of each product unit; extract the set of features from each image; and generate a multi-dimensional vector, in a set of vectors, representing the set of features for each product unit associated with this retail space.

The computer system can repeat these methods and techniques for other product units associated with other retail spaces and store these vectors in a template database or multi-dimensional (e.g., "n-dimensional") space. The computer system can further group a cluster of vectors by a particular product type or product identifier (e.g., SKU) within a multi-dimensional space and group these vectors into clusters of vectors exhibiting (relatively) high degrees of similarity in some dimensions of the multi-dimensional space.

The computer system can then: access a photographic image from the remote database captured by the mobile robotic system during a scan cycle; extract features of a new product unit from the photographic image; generate a multi-dimensional space vector representing this set of features; and automatically detect and identify a product type of a new product unit based on corresponding features representative of this product unit within the multi-dimensional space.

Therefore, the computer system can generate a multi-dimensional space to record visual characteristics of each unique product unit frequently occurring within many retail spaces in real-time rather than generating a template image database of stock images of product units within each retail space.

7.1 Product Detection: Feature Extraction+Vector Generation

Generally, the computer system can: access a set of images, recorded by the mobile robotic system over a period of time (e.g., one day, one week, one month) from the remote database; detect a set of objects in an image; detect the set of objects in subsequent images in the set of images; and track a frequency of occurrence of the set of objects in the set of images within the period of time. Then, in response to the frequency of occurrence exceeding a threshold frequency, the computer system can: extract a set of visual features of the set of objects from the set of images; generate a multi-dimensional vector, in a set of vectors, representing the set of features for each object; and populate the template image database with template images in multi-dimensional form such as multi-dimensional matrices or vectors representative of visual features on product packaging.

More specifically, the computer system can: access an image (e.g., segmented and cropped photographic image) from the remote database; identify multiple (e.g., "n," or "many") features representative of a product unit, of a particular product type, depicted in the photographic image; characterize these features; and aggregate these features into a multi-dimensional (e.g., n-dimensional) vector uniquely representing visual characteristics—such as a packaging profile, a color palette, relative positions, relative orientations, or textual characteristics—of this product unit, of the particular product type.

In one implementation, the computer system: accesses an image, in a set of images, of a shelving structure captured by the mobile robotic system while navigating through a store; detects a slot on the shelving structure, depicted in the image; detects an object occupying the slot depicted in a region of the image; extracts a set of visual features—such as geometry, color, or text features—from the region of the image; reads a product identifier (e.g., a SKU) directly from the object based on the set of visual features; and identifies a product type of the object stored in a planogram or other product database and associated with the product identifier.

The computer system then: generates a multi-dimensional vector (e.g., an array of floating-point numbers), in a set of vectors, representing the set of visual features of the product unit and linked to the product identifier; and populates a multi-dimensional space with this vector representative of visual features on product packaging extracted from the image. The computer system can further annotate the vector with a relative position and a relative orientation of the object occupying the slot on the shelving structure based on features extracted from the image.

The computer system can repeat this method and technique for each other object, for each other image, and for each other shelving structure to generate a template database in the form of a multi-dimensional space representing visual features of each product type.

7.1.1 Visual Embedding Model

In one variation, the computer system accesses a visual embedding model trained to automatically: represent visual features—extracted from an image captured by the robotic system—in a vector; project the vector in the multi-dimensional space; and automatically identify a product type of a product unit depicted in the image based on proximity between the vector and a cluster of template vectors—associated with the product type—in the multi-dimensional space.

In particular, in this variation, the computer system can: access a first image of an inventory structure captured by the robotic system; detect a first slot on the second inventory structure depicted in the first image; detect an object arranged in the first slot of the inventory structure in the first image; extract a first set of visual features—representing a packaging profile of the object—from the first image; and access a visual embedding model defined for the facility and trained to ingest visual features extracted from images captured by the robotic system and automatically represent these visual features in vectors in the multi-dimensional space. Then, the computer system can implement the visual embedding model to: represent the first set of visual features in a first vector representing the packaging profile of the object; calculate a similarity score between the first set of visual features represented in the first vector and template visual features represented in a first cluster of template vectors in the multi-dimensional space based on proximity between the first vector and the first cluster of template vectors in the multi-dimensional space; and, in response to the similarity score exceeding a threshold score, identify the object as a product unit of a first product type affiliated with a first product identifier associated with the first cluster of template vectors.

In one implementation, the visual embedding model can be trained based on pairs of images of product units of a set of product types available at the facility.

For example, the computer system can generate a first image packet including: a first image depicting a first product unit of a first product type arranged in a first relative orientation and in a first lighting condition; and a second image depicting a second product unit of the first product type arranged in a second relative orientation and in a second lighting condition. The computer system can then label this first image packet with a first label indicating that the first image and the second image both depict product units of the first product type. Then, the computer system can generate a second image packet including: a third image depicting a third product unit of the first product type arranged in a third relative orientation and in a third lighting condition; and a fourth image depicting a fourth product unit of a second product type arranged in a fourth relative orientation and in a fourth lighting condition. The computer system can then label this second image packet with a second label indicating that the third image and the fourth image both depict product units of different product types including the third product type and the fourth product type.

The computer system can then repeat this process to generate a corpus of image packets—including images depicting product units of the same or different product types and labeled accordingly—and then feed this corpus of image packets to the visual embedding model. The computer system can thus train the visual embedding model to represent each image—and/or visual features extracted from these images—as a vector in the multi-dimensional space based on visual features extracted from these images and labels appended to these images. Furthermore, by providing pairs of (different) images of the same product type—depicting variable conditions (e.g., orientation, lighting) and/or variations in packaging—the computer system can train the visual embedding model to identify a particular product type depicted in an image regardless of variance (e.g., below a threshold) in these images.

Furthermore, in the preceding implementation, the computer system can leverage real images—captured in the facility (e.g., by the robotic system)—of product units of each product type to train the visual embedding model. Additionally, the computer system can leverage real images of product units of each product type to generate additional "synthetic" images—such as modified or skewed images derived from real images—and train the visual embedding model with this expanded set of images including real images and "synthetic" images of product units. The computer system can thus implement the visual embedding model to generate additional template vectors in the multi-dimensional space based on these modified "synthetic" images.

7.2 Vector and Product Identifier Pairs+Product Database

Generally, the computer system can pair (or "link," "associate") each vector representation of a cropped image, depicting an object, with a corresponding product identifier and populate the multi-dimensional space with these vector and product identifier pairs.

In one implementation, the computer system can: read a product identifier from a tag arranged proximal an object occupying a slot on a shelving structure; access a product database; identify a product type of the object associated with the product identifier within the product database; and associate the vector representation of the cropped image, depicting the object, with the product type to generate a vector and product identifier pair within the multi-dimensional space.

Furthermore, the product database can include a list, a table, or other index of product identifiers such as: global trade item numbers (e.g., GTINs) that represent international standardized product identifiers for all stores, universal product codes (e.g., UPCs); quick response codes (e.g., QR codes); product descriptions; stock keeping units (e.g., SKU) that are unique to each product for a particular store; and/or a product type associated with each product identifier (e.g., GTIN, SKU, UPC). The computer system can thus search the product database of a particular store to identify a product type of an object from a corresponding product identifier.

7.2.1 Region-of-Interest+Autonomous Vector Annotation

In another implementation, the computer system implements computer vision techniques to detect a region-of-interest within a cropped image and reads the product identifier from this region-of-interest. In this implementation, the computer system can: access a set of rules specifying regions-of-interest—such as a subregion of an image depicting a tag, a barcode, a particular iconograph, a particular set of text features (e.g., a text string), or a bottom left corner of a slot depicted in an image—and defined by a store manager or associate of the store; access an image from the remote database; divide the image into image segments or crop areas; and select a subset of these image segments that intersects a particular region-of-interest based on the set of rules. The computer system can then extract features from each of these image segments and compile these features into a product identifier that represents the particular region-of-interest.

In one variation, the computer system: accesses an image, in a set of images, of a shelving structure captured by the mobile robotic system while navigating through a store; detects a slot, in a set of slots on the shelving structure, depicted in the image; detects an object occupying the slot depicted in a region of the image; extracts a set of visual features from the region of the image; accesses a set of rules specifying regions-of-interest for the store; identifies a tag, proximal the slot, in a second region of the image based on the set of rules; and reads a product identifier from the second region of the image.

The computer system then: accesses a product database for the store; identifies a product type of the object associated with the product identifier within the product database; represents the set of visual features as a vector; pairs the vector with the corresponding product identifier from the product identifier database; and populates the multi-dimensional space with the vector and product identifier pair.

For example, the computer system: accesses an image, in a set of images, of a shelving structure captured by the mobile robotic system while navigating through a grocery store; detects a slot, in a set of slots on the shelving structure, depicted in the image; detects an object occupying the slot, in the set of slots depicted in a region of the image; extracts a set of visual features representing a packaging profile of a primary face of the object—such as a dimension, a geometry, a shape, a color palette, iconography features, or text features—from the region of the image; identifies a shelf tag (e.g., a paper tag, an electronic shelf label), proximal the slot, in a second region of the image; and extracts a second set of features representing a product identifier, such as a GTIN value from the second region of the image.

The computer system then: accesses a product database for the grocery store; identifies a product type of the object, such as ACME crackers, associated with the GTIN value within the product database; transforms the set of visual features into a vector, such as an array of floating-point numbers unique to the object; pairs the vector with the corresponding GTIN value from the product identifier database; and populates the multi-dimensional space with the vector and GTIN value pair.

Therefore, the computer system can automatically read product identifiers from a tag arranged proximal an object occupying a slot and identify the product type of the object based on product data stored in a product database in order to generate a vector and product identifier pair for the object. The computer system can further populate the multi-dimensional space with the vector and product identifier pair and thus, assemble a template image database, searchable by product identifier, from digital photographic images in real-time.

7.2.2 Absent Region-of-Interest+Manual Vector Annotation

In one variation, responsive to detecting absence of a region-of-interest or tag within an image according to the set of rules, the computer system can generate a prompt to provide a global product identifier for the object and serve the prompt and the cropped image of the object, annotated with a location, to a user. The user may manually upload an annotated cropped image with a global product identifier and the computer system can then implement methods and techniques described above to represent visual features of the object, depicted in the cropped image, as a vector, pair the vector with the global product identifier, and populate the multi-dimensional space with the vector and global product identifier pair.

For example, the computer system can: access an image, in a set of images, of a shelving structure captured by the mobile robotic system while navigating through a store; detect a slot, in a set of slots on the shelving structure, depicted in the image; detect an object occupying the slot depicted in a region of the image; extract a set of visual features from the region of the image; access a set of rules specifying regions-of-interest for the store; and, in response to detecting absence of a region-of-interest within the image, generate a prompt requesting a global product identifier for the object depicted in the image and transmit the prompt and the image to a computing device associated with a store manager.

The store manager may then annotate the image with a GTIN value associated with the object on the computing device and the computer system can update the product database with the GTIN value and represent the set of visual features as a vector linked to the GTIN value.

Thus, the computer system can detect absence of a region-of-interest within an image and interface with a computing device of a user affiliated with the store to retrieve a product identifier for this object rather than autonomously retrieving the product identifier from the region-of-interest.

7.3 Vector Clustering

In one implementation, the computer system can implement structured data analysis techniques (e.g., linear regression analysis, cluster analysis, k-means clustering, and/or other statistical analysis and machine learning techniques) to partition the set of vectors—each uniquely representing multiple features of one product unit—into multiple groups or "clusters" of vectors representing similar combinations of features and/or similar feature ranges in one or more dimensions in the multi-dimensional space.

For example, the computer system can populate the multi-dimensional space with a set of template vectors including: a first cluster of template vectors associated with a first product identifier of a first product type; a second cluster of template vectors associated with a second product identifier of a second product type; a third cluster of template vectors associated with a third product identifier of a third product type; etc. In this example, the computer system can: access an image of an inventory structure captured by the robotic system; detect an object arranged in a first slot of the inventory structure in the image; extract a set of visual features—representing a packaging profile of the object—from the image; represent the set of visual features in a vector representing the packaging profile of the object; and, calculate similarity scores between the vector and each cluster of template vectors in the multi-dimensional space based on proximity between the vector and each of these clusters. Therefore, the computer system can leverage these "clusters" to predict and/or identify a product type of a particular product unit depicted in an image.

8. Escalate Multi-Dimensional Space

Generally, the computer system maintains a template image database (or "multi-dimensional space"), such that each vector representation of a photographic image in the multi-dimensional space is associated with a product identifier (e.g., a GTIN, a SKU, a UPC) and includes multiple facings and packaging variations of each object.

More specifically, the multi-dimensional space can further store: vector representations of images depicting each product unit in various lighting conditions; vector representations of images depicting damaged packaging of each product unit; and/or vector representations of images depicting packaging orientations of each product unit in order to maintain a database of vector representations of real images depicting real product units, of identified product types, stocked on inventory structures within a store.

In particular, in one implementation, the computer system can: access a first image of a first inventory structure captured by the robotic system while navigating within the facility; detect a first slot, on the first inventory structure, depicted in the first image; detect a first product unit occupying the first slot depicted in a first region of the first image; extract a first set of visual features—representing the first product unit—from the first region of the first image; detect a first tag (e.g., a shelf label), proximal the first slot, in a second region of the first image; identify a first product identifier of a first product type of the first product unit based on features detected in the second region of the first image; represent the first set of visual features in a first template vector in a set of template vectors; label the first template vector with the first product identifier; and project the first template vector—labelled with the first product identifier—in the multi-dimensional space.

The computer system can then: access a second image of a second inventory structure captured by the robotic system while navigating within the facility; detect a second slot, on the second inventory structure, depicted in the second image; detect a second product unit occupying the second slot depicted in a third region of the second image; extract a second set of visual features—representing the second product unit—from the third region of the second image; detect a second tag, proximal the second slot, in a fourth region of the second image; identify a second product identifier of a second product type of the second product unit based on features detected in the fourth region of the second image; represent the second set of visual features in a second template vector in the set of template vectors; label the second template vector with the second product identifier; and project the second template vector—labelled with the second product identifier—in the multi-dimensional space.

The computer system can thus populate the multi-dimensional space with the set of template vectors including: the first template vector representing the first product unit of the first product type; and the second template vector representing the second product unit of the second product type. The computer system can then repeat this process for each other image captured by the robotic system to generate the set of template vectors—representing product units of a set of product types offered by the facility—projected in the multi-dimensional space.

For example, for an object associated with a particular GTIN and packaged in a six-sided box, the multi-dimensional space can include: a vector representing a cropped image squarely depicting the front (or "primary") face of the box and tagged with a corresponding product identifier; a second vector representing a second cropped image squarely depicting the rear face of the box and tagged with the corresponding product identifier; a third vector representing a third cropped image squarely depicting the right face of the box and tagged with the corresponding product identifier; a fourth vector representing a fourth cropped image squarely depicting the left face of the box and tagged with the corresponding product identifier; a fifth vector representing a fifth cropped image squarely depicting the top face of the box and tagged with the corresponding product identifier; a sixth vector representing a sixth cropped image squarely depicting the bottom face of the box and tagged with the corresponding product identifier; a seventh vector representing a seventh cropped image depicting the box angled to evenly expose both the front face and the right face of the box and tagged with the corresponding product identifier; and an eighth vector representing an eighth cropped image depicting the box angled to expose the front face, the right face, and the top face of the box and tagged with the corresponding product identifier.

In this example, the template image database can further include: a ninth vector representing a ninth cropped image depicting the primary face of the box in an artificial bright lighting condition and tagged with a corresponding product identifier; a tenth vector representing a tenth cropped image depicting the primary face of the box in a natural bright lighting condition and tagged with the corresponding product identifier; an eleventh vector representing an eleventh cropped image depicting the primary face of the box in an artificial dull lighting condition and tagged with the corresponding product identifier; a twelfth vector representing a twelfth cropped image depicting the primary face of the box in a natural dull lighting condition and tagged with the corresponding product identifier; and a thirteenth vector representing a thirteenth cropped image depicting the primary face of the box in a combined bright artificial and natural lighting condition and tagged with the corresponding product identifier.

The computer system can further annotate (e.g., label, tag) each vector in the multi-dimensional space with a product description, a supplier, a supply period, a graphics release date, a secondary graphic, a barcode, a packaging profile (e.g., shape, size, dimension, geometry, color palette), a packaging orientation, and/or other quantitative or qualitative product packaging features or descriptors.

However, the multi-dimensional space can include vector representations of template images depicting any other orientation of a product or product packaging and annotated with (e.g., tagged with) any other relevant data.

8.1 "Synthetic" Template Vector Generation

Generally, as described above, the computer system maintains the multi-dimensional space including vector representations of photographic images of product units of each product type offered in (e.g., for sale) and/or affiliated with the facility. The computer system can associate each vector representation with a product identifier associated with the product type and can populate the multi-dimensional space with multiple vectors—corresponding to the same product type—representing different facings and packaging variations of the product type.

The computer system can thus maintain a database of vector representations of real images depicting real product units, of identified product types, stocked on inventory structures within the facility.

Figure 4A:
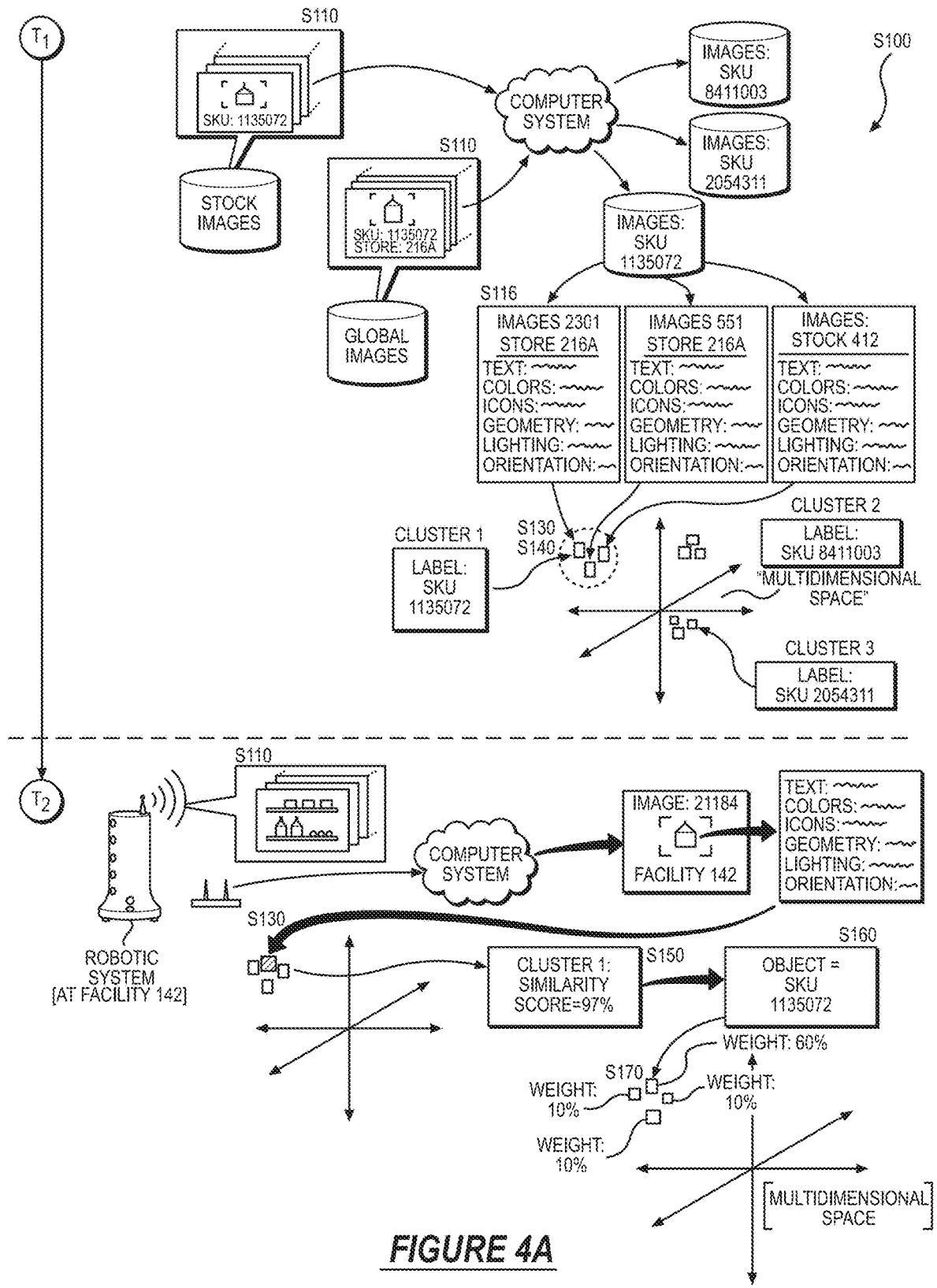
FIGS. 4A and 4B are flowchart representations of one variation of the method.
Figure 4B:
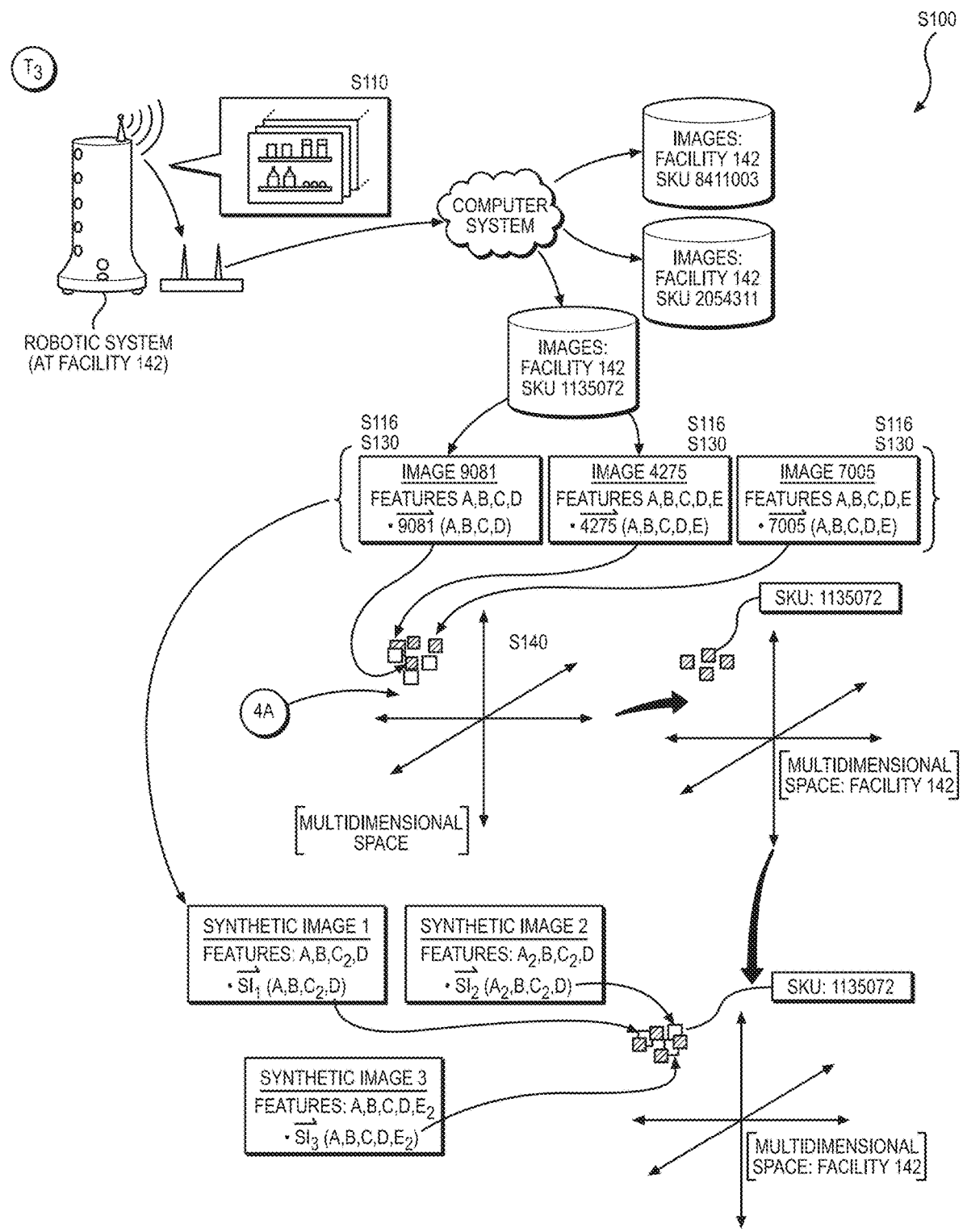

Furthermore, in one variation, as shown in FIG. 4B, the computer system can generate additional template vectors (or "synthetic template vectors")—derived from template vectors representing real images depicting real product units in the facility—representing "synthetic" images depicting product units of product types affiliated with the facility. For example, the computer system can generate synthetic template vectors depicting product units in a particular lighting condition and/or from a particular viewing angle not represented in real images captured by the robotic system. In this variation, the computer system can store both "original" or "real" template vectors—derived from real images of product units stocked on inventory structures within the facility—and synthetic template vectors in the multi-dimensional space. Therefore, the computer system can automatically generate these synthetic template vectors to expand a quantity of template vectors populating the multi-dimensional space.

In one example, the computer system can: access a first image of a first inventory structure captured by the robotic system while navigating within the facility; detect a first slot, in a set of slots, on the first inventory structure, depicted in the first image; detect a first product unit occupying the first slot depicted in a first region of the first image; and extract a first set of visual features—representing the first product unit—from the first region of the first image. For example, the computer system can extract the first set of visual features including a first packaging profile, a first set of text features, a first relative orientation, and a first lighting condition of the first product unit depicted in the first image. The computer system can then: detect a first tag (e.g., a shelf label), proximal the first slot, in a second region of the first image; identify a first product identifier of a first product type of the first product unit based on features detected in the second region of the first image; represent the first set of visual features in a first template vector in a set of template vectors; label the first template vector with the first product identifier; and populate the multi-dimensional space with the first template vector representing verified products within the facility.

Then, in the preceding example, in order to generate additional template vectors for the first product type, the computer system can: based on the first set of visual features and a first variance factor, calculate a second set of visual features representing a first synthetic variation of the first product unit; and represent the second set of visual features in a second template vector (i.e., a synthetic template vector) in the set of template vectors; and label the second template vector with the first product identifier. For example, the computer system can calculate the second set of visual features including the first packaging profile, the first set of text features, the first relative orientation, and a second lighting condition (e.g., different from the first lighting condition). Furthermore, the computer system can: based on the first set of visual features and a second variance factor exceeding the first variance factor, calculate a third set of visual features representing a second synthetic variation of the first product unit; represent the third set of visual features in a third template vector in the set of template vectors; and label the third template vector with the first product identifier. For example, the computer system can calculate the second set of visual features including the first packaging profile, the first set of text features, a second relative orientation (e.g., different from the first relative orientation), and a third lighting condition (e.g., different from the first lighting condition).

The computer system can then populate the multi-dimensional space with the set of template vectors including: the first template vector representing the first product unit depicted in the first image captured by the robotic system; the second template vector representing the first product unit depicted in a second "synthetic" image automatically derived from the first image; and the third template vector representing the first product unit depicted in a third "synthetic" image automatically derived from the first image. The computer system can thus modify or skew the first image to derive these additional "synthetic" images depicting the product unit of the first product type in varying conditions and/or with modifications to the packaging profile, thereby enabling identification of product units of the first product type in images captured by the robotic system regardless of variance (e.g., less than a threshold variance) in these images and/or in packaging for this first product type.

8.2 Weighted Template Vectors

In one variation, as shown in FIG. 4A, the computer system can assign weights to template vectors in a cluster of template vectors affiliated with a particular product type in a set of product types affiliated with the facility.

In particular, in this variation, the computer system can: assign a relatively higher weight to template vectors representing images—captured at the facility—of product units stocked on inventory structures in this particular facility; and assign a relatively lower weight to template vectors representing images of these product units captured at a different facility and/or corresponding to stock images of these product units. Therefore, the computer system can more heavily weight images of products captured at this particular facility, which may more clearly depict visual features (e.g., lighting conditions, orientations on shelves) of these product units at this particular facility and thereby enable improved detection of product units in images captured at this facility.

For example, the computer system can: access a first image—representing a stock image—of a first product unit of a first product type; extract a first set of visual features—representing the first product unit—from the first image; represent the first set of visual features in a first template vector in a set of template vectors; label the first template vector with a first product identifier affiliated with the first product type; and assign a first weight to the first template vector. Then, the computer system can: access a second image of an inventory structure captured by the robotic system; detect a second product unit occupying a slot depicted in a first region of the second image; extract a second set of visual features from the first region of the second image; detect a first tag, proximal the first slot, in a second region of the second image; identify a first product identifier of the first product type of the first product unit based on features detected in the second region of the second image; represent the second set of visual features in a second template vector in the set of template vectors; label the second template vector with the first product identifier; and assign a second weight—exceeding the first weight—to the first template vector. The computer system can then populate the multi-dimensional space with the first template vector and the second template vector.

In one implementation, as shown in FIGS. 4A and 4B, the computer system can replace template vectors—derived from images of product units located in a population of facilities—with template vectors derived from images of product units located in this particular facility over time.

In particular, in this implementation, at a first time, the computer system can: populate the multi-dimensional space with a first cluster of template vectors—associated with a first product type in a set of product types—including: a first subset of template vectors affiliated with the first product identifier—associated with the first product type—and representing visual features of product units of the first product type located within the facility; and a second subset of template vectors affiliated with the first product identifier and representing visual features of product units of the first product type and located in locations external the facility. Later, in response to identifying a product unit of the first product type in an image captured at the facility, the computer system can: represent a set of visual features—extracted from the image—in a vector representing the product unit of the first product type; store the vector—labelled with the first product identifier and representing the set of visual features of the product unit located within the facility—in the multi-dimensional space; and update a quantity of vectors in the first subset of template vectors—representing visual features of product units of the first product type located within the facility—based on the vector. Then, in response to storing the vector in the multi-dimensional space and in response to the quantity of template vectors in the first subset of template vectors exceeding a threshold quantity (e.g., 10, 100, 1000), the computer system can remove or discard the second subset of template vectors from the multi-dimensional space, such as by assigning a weight of "null" to the second subset of template vectors. For example, in response to the multi-dimensional space including 100 template vectors derived from real images of product units of the first product type captured in this particular facility, the computer system can discard additional template vectors—of product units of the first product type—derived from images captured external this particular facility.

Additionally or alternatively, in this implementation, in response to the quantity of template vectors in the first subset of template vectors—representing visual features of product units of the first product type located within the facility—falling below the threshold quantity, the computer system can: assign a first weight to template vectors in the first subset of template vectors in the first cluster of template vectors; and assign a second weight—less than the first weight—to template vectors in the second subset of template vectors in the first cluster of template vectors.

9. Feature Matching

Generally, responsive to a current set of features corresponding to a template set of features within the multi-dimensional space, the computer system can automatically detect and identify product units arranged on the display without paper tags, promotional tags, or electronic shelf labels specifying a product identifier for each product unit on the display.

In one implementation, the computer system can: access an image of an end-cap captured by the mobile robotic system during a scan cycle; detect an object arranged on the end-cap in the image; extract a set of features, representing visual characteristics of the object, from the image; represent the set of features as a vector; and identify the product type of the object by matching the vector to a template vector stored in the multi-dimensional space.

Furthermore, the computer system can identify the product type of the object based on the set of features such as by a) matching a color histogram of the object to a stored template color histogram of a verified product type within the multi-dimensional space, b) matching a shape of the object to a stored template geometry of the verified product type within the multi-dimensional space, c) matching textual features on the object to stored textual features on the verified product type within the multi-dimensional space and/or d) matching a packaging profile or iconography on the object to stored template icons on the verified product type within the multi-dimensional space. The computer system can then calculate a similarity score for correspondence (e.g., a match, similarity) between the vector representation of the cropped image of the object and a template vector in the multi-dimensional space, such as proportional to a quantity of matched features between the vector and the template vector.

9.1 Similarity Score+Product Detection

In one variation, the computer system can: select a set of template vectors within the multi-dimensional space based on a shortest distance (e.g., a Euclidean distance) to the vector representation; calculate a similarity score between the vector representation of a cropped image depicting an object and a cluster of template vectors from the multi-dimensional space; and assign the product type and product identifier to the vector representation of the object in response to the similarity score exceeding all other similarity scores for the cluster of template vectors and exceeding a preset threshold score.

Additionally or alternatively, in response to the similarity score falling below the (preset) threshold score, the computer system can reject the product identifier for assignment to the vector. Furthermore, the computer system can then: calculate a second similarity score between the second set of visual features represented in the vector and template visual features represented in a second cluster of template vectors—affiliated with a second product identifier of a second product type—in response to the vector approximating the second cluster of template vectors in the multi-dimensional space; and, in response to the second similarity score exceeding the threshold score, identify the object as a product unit of the second product type affiliated with the second product identifier associated with the second cluster of template vectors. The computer system can then assign the second product identifier to the vector; and store the vector—labelled with the second product identifier—in the multi-dimensional space. The computer system can thus repeat this process in order to: identify a particular cluster of template vectors in the multi-dimensional space that approximates the vector; and, therefore, identify a particular product type corresponding to this particular cluster of template vectors.

In one variation, the computer system can: access an image of an inventory structure captured by the mobile robotic system during a scan cycle; detect an object arranged on a shelf of the inventory structure in the image; extract a set of features, representing a packaging profile of the object, from the image; and represent the set of features as a vector for the object.

The computer system can then: select a set of template vectors within the multi-dimensional space based on a Euclidean distance to the vector; calculate a similarity score between the vector and a set of template vectors from the multi-dimensional space; and, in response to the similarity score exceeding a threshold score (e.g., 80%), identify the object as a verified product unit of a product type associated with the set of template vectors and assign the product identifier, linked to the set of template vectors, to the vector and store the vector in the multi-dimensional space.

Therefore, the computer system can assign a product identifier and a product type to an object, detected in an image captured by the mobile robotic system, based on proximity to a cluster of template vectors in the multi-dimensional space without a shelf tag, an electronic shelf label, a hang tag, or promotional tag specifying product data for the object.

9.2 Feature Mismatch: New Packaging

In one implementation, responsive to detecting absence of a match (e.g., a mismatch, a deviation) between a vector representation of a cropped image depicting an object and a cluster of template vectors in the multi-dimensional space, the computer system can generate and serve a prompt to upload a stock image of current product packaging for the object.

In one variation, in response to the similarity score between the vector representation and a cluster of template vectors falling within a preset confidence range (e.g., between 50% and 75%), the computer system can: identify the object as a verified product unit of a product type associated with the cluster of template vectors and assign the product identifier, linked to the cluster of template vectors, to the vector; generate a prompt to upload a stock image of current product packaging for the product unit; and serve this prompt to an associate of the store or a supplier of the product. The computer system can then: receive a stock image of the product unit, such as a computer drafted photographical or graphical representation of all or a portion of the packaging of the product unit; represent the stock image as a template vector annotated with the product identifier; and populate the multi-dimensional space with the template vector. The computer system can later replace the template vector with a vector representation of a cropped photographic image depicting the new packaging of the product unit, as described above.

In particular, in this variation, the computer system can: access a first image of a first inventory structure captured by the robotic system; detect a first slot on the first inventory structure depicted in the first image; detect an object arranged in the first slot of the first inventory structure in the first image; extract a first set of visual features—representing a packaging profile of the object—from the first image; generate a vector representing the first set of visual features; and, in response to the vector approximating a first cluster of template vectors in the multi-dimensional space, calculate a first similarity score between the first set of visual features represented in the vector and template visual features represented in the first cluster of template vectors based on proximity between the vector and the first cluster of template vectors in the multi-dimensional space.

Figure 6:
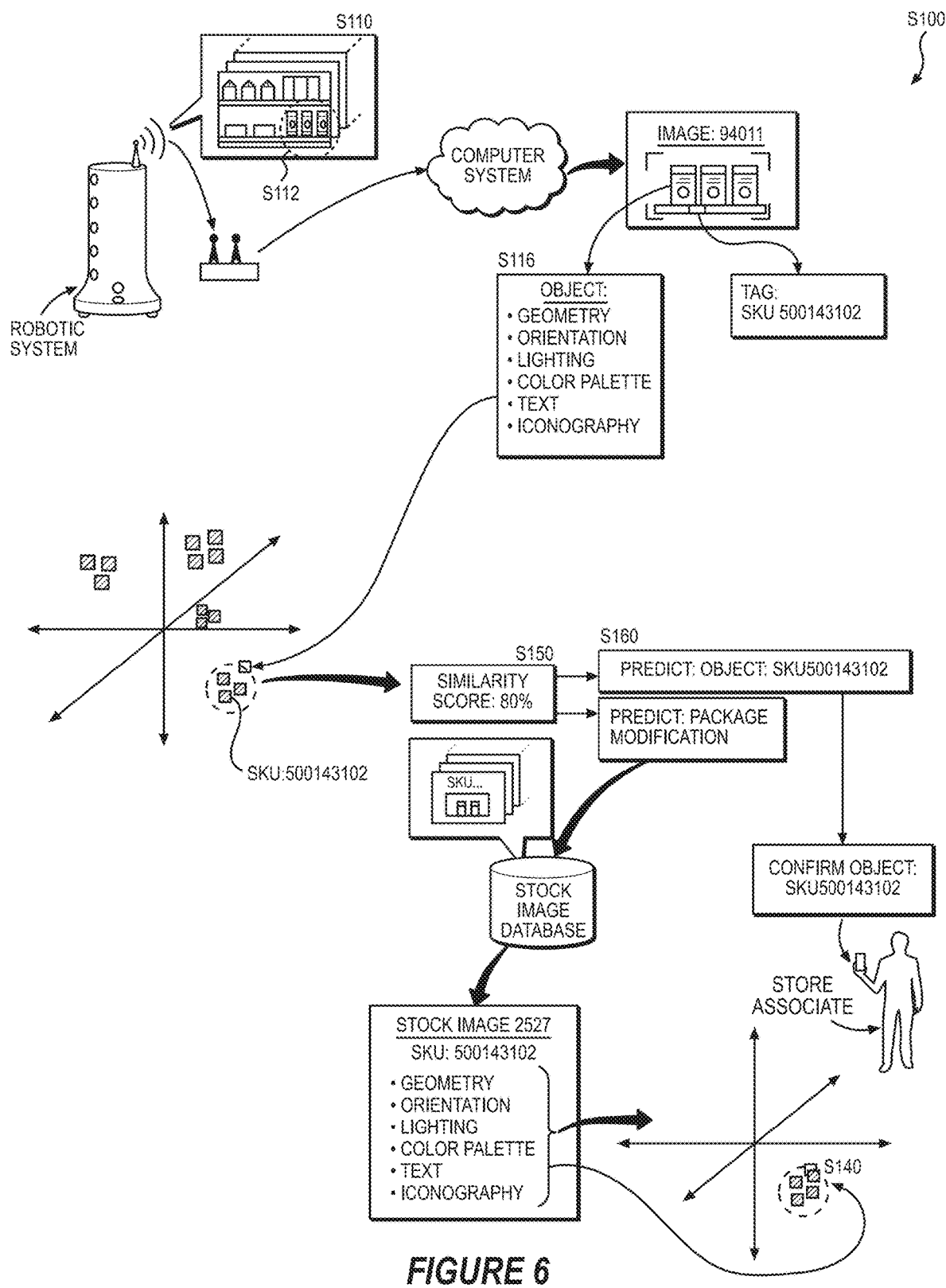
FIG. 6 is a schematic representation of one variation of the method.

Then, in response to the first similarity score falling below a threshold score and exceeding a lower threshold score, as shown in FIG. 6, the computer system can: predict the object as a product unit of the first product type affiliated with a first product identifier associated with the first cluster of template vectors; assign the first product identifier to the vector; generate a prompt to upload a stock image of current product packaging for the object; and transmit the prompt to a computing device accessed by a user affiliated with the facility. Then, in response to receiving the stock image of current product packaging for the object, the computer system can: extract a second set of visual features—representing current product packaging of the object in the stock image—from the stock image; represent the second set of visual features in a new template vector; label the new template vector with the first product identifier; and populate the multi-dimensional space with the new template vector (e.g., proximal the first cluster of template vectors in the multi-dimensional space).

Additionally or alternatively, the computer system can track the object occupying a particular slot on a shelving structure within a store based on a sequence of images captured by the mobile robotic system for a period of time (e.g., five days, one week, two weeks) and generate a set of vector representations of cropped images depicting the object during this period of time. Then, the computer system can: calculate a similarity score representing similarity of features between a vector and each other vector in the set of vector representations; and calculate a total similarity score for the object based on combined similarity scores between the vector and each other vector in the set of vector representations.

Then, in response to the total similarity score exceeding the preset confidence range (e.g., between 50% and 75%), the computer system can: identify visual features, representing a new packaging profile of the object detected in the images, as the current packaging profile of the object; and store the vector as a template vector in the multi-dimensional space.

Therefore, the computer system can autonomously detect a new packaging profile of a product by tracking frequency of occurrence of visual features of a particular object and generate a new template vector for the new packaging profile. Additionally, the computer system can prompt a user to provide a stock image depicting a current packaging profile of the product and transform the stock image into the new template vector for the new packaging profile.

9.3 Stocking Discrepancy: Mismatch Between Actual Product & Shelf Tag

Figure 5:
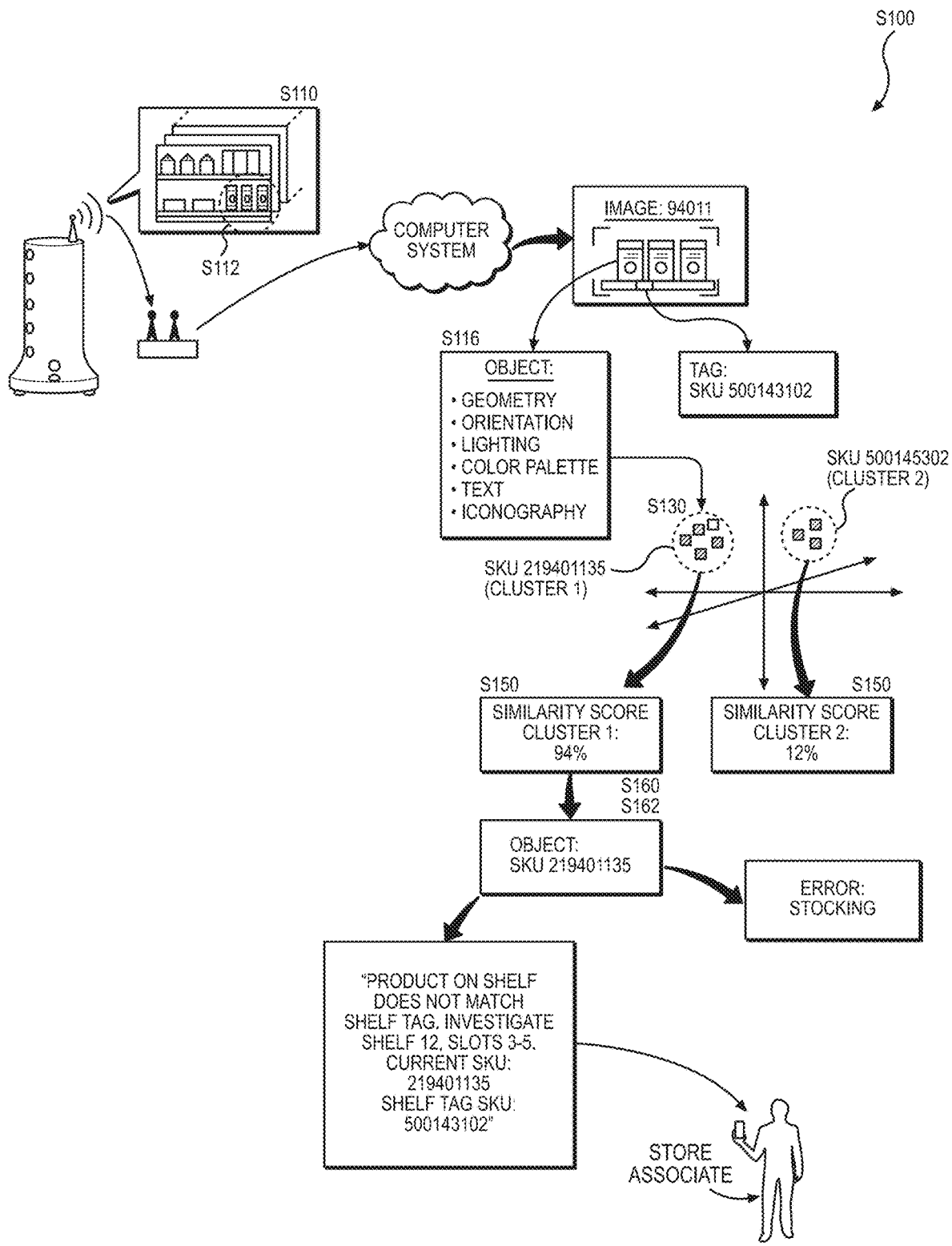
FIG. 5 is a flowchart representation of one variation of the method.

In one implementation, as shown in FIG. 5, responsive to detecting absence of a match (e.g., a mismatch, a deviation) between a vector representation of a product unit and a cluster of template vectors in the multi-dimensional space, the computer system can detect a stocking error corresponding to incorrect placement of the product unit in a slot—in a set of slots in an inventory structure—assigned to a particular product type differing from a product type of the product unit occupying the slot.

For example, in this implementation, the computer system can: access a first image of a first inventory structure captured by the robotic system while navigating within the facility; detect a first slot, in a set of slots, on the first inventory structure, depicted in the first image; detect a first product unit occupying the first slot depicted in a first region of the first image; extract a first set of visual features from the first region of the first image; detect a first tag, proximal the first slot, in a second region of the first image; identify a first product identifier of a first product type of the first product unit based on features detected in the second region of the first image; represent the first set of visual features—including the first product identifier—in a first vector; locate a first cluster of template vectors—associated with the first product identifier affiliated with a first product type—in the multi-dimensional space; calculate a first similarity score between the first set of visual features represented in the vector and template visual features represented in the first cluster of template vectors based on proximity between the vector and the first cluster of template vectors in the multi-dimensional space; and, in response to the first similarity score falling below a threshold score, flag the first slot for a stocking discrepancy between the first tag, advertising the first product type, and the first product unit—occupying the first slot—of a second product type different from the first product type. The computer system can then: identify the second product type of the first product unit based on proximity between the vector and a second cluster of template vectors—associated with the second product identifier affiliated with the second product type—in the multi-dimensional space; generate a notification indicating the stocking discrepancy; transmit the notification to an associate affiliated with the facility; and label the vector with the second product identifier of the second product type.

In another example, the computer system can: access a first image of a first inventory structure captured by the robotic system while navigating within the facility; detect a first slot, in a set of slots, on the first inventory structure, depicted in the first image; detect a first product unit occupying the first slot depicted in a first region of the first image; extract a first set of visual features from the first region of the first image; detect a first tag, proximal the first slot, in a second region of the first image; identify a first product identifier of a first product type advertised by the first tag; represent the first set of visual features in a first vector labelled with the first product identifier; and, in response to the vector approximating a first cluster of template vectors in the multi-dimensional space, calculate a similarity score between the first set of visual features represented in the first vector and template visual features represented in the first cluster of template vectors. Then, in response to the first similarity score exceeding a threshold score, the computer system can: identify the object as a product unit of a second product type affiliated with a second product identifier associated with the first cluster of template vectors; assign the second product identifier to the vector; flag the first slot for a stocking discrepancy between the first tag, advertising the first product type, and the product unit of the second product type; generate a notification indicating the stocking discrepancy; transmit the notification to an associate affiliated with the facility; and label the vector with the second product identifier of the second product type.

Therefore, the computer system can leverage the template database (or "multi-dimensional space") of template vectors to identify stocking errors and/or discrepancies—such as a mismatch between a product type of a product unit in a slot and a product type advertised by the shelf tag affixed to the slot—and selectively notify an associate of these errors for correction.

9.4 Human in the Loop

In one variation, the computer system can prompt an associate—affiliated with the facility—to verify whether multiple images depict product units of the same or a different product type based on modification to a packaging profile of these product units and/or conditions (e.g., lighting conditions, orientation) during image capture.

For example, the computer system can access a set of 100 images—depicting a particular slot in an inventory structure—captured over a particular time period and at a particular frequency (e.g., once per day, once per week). For each image in the set of 100 images, the computer system can: extract a set of visual features representing a product unit occupying the slot in the inventory structure depicted in the image; detect a tag proximal the slot depicted in the image; identify a product identifier—associated with a first product type—represented on the tag in the image; represent the set of visual features in a vector; label the vector with the product identifier associated with the first product type; and calculate a similarity score between the second set of visual features represented in the vector and template visual features represented in a first cluster of template vectors associated with the first product identifier of the first product type. Then, in response to similarity scores for a first subset of 50 images, in the set of 100 images, exceeding a threshold score, the computer system can automatically identify and/or confirm product units of the first product type occupying the slot during capture of images in the first subset of images. However, in response to similarity scores for a second subset of 50 images, in the set of 100 images, falling below the threshold score and exceeding a lower threshold score, the computer system can: identify product units of the first product type occupying the slot during capture of images in the second subset of 50 images; flag the first product type for a packaging discrepancy; generate a notification indicating the packaging discrepancy; append the notification with a prompt to confirm product units of the first product type occupy the slot and that the second subset of 50 images depict product units of the first product type; and transmit the notification to an associate affiliated with the facility.

Then, in response to receipt of confirmation that the second subset of 50 images depict product units of the first product type, the computer system can generate additional template vectors for the first product type, such as representing a change in packaging for the first product type; and populate the multi-dimensional space with these additional template vectors representing the detected change in packaging.

10. Output: Stock Map or Inventory Database

Generally, the computer system serves a stocking status of one or more slots, shelves, shelving segments, shelving structures, etc. within the store to a stock map containing slot data of slots in the store, captured by the mobile robotic system during a scan cycle.

In one implementation, the stock map can include composite images of corresponding shelving structures annotated with a numerical indicator of a proportion of total product facings (e.g., ½, 50%) assigned to each slot in the shelving structure, and color-coded flags for empty, understocked, improperly stocked, and misoriented product facings in slots on the shelving structure. The computer system can then serve the stock map to a user (e.g., a store manager or associate of the store) through a user portal, and thereby enable the user to view visual and stock data of the store.

11. Variation: Stock Images+Template Image Database

In one variation, prior to accessing the remote database for images captured by the mobile robotic system, the computer system can: receive stock images of each packaging variation of an instance of each product associated with the store; represent each stock image as a multi-dimensional vector; and store these vectors in a multi-dimensional space to generate a template image database. The computer system can then implement methods and techniques described above to access digital photographic images, captured by the mobile robotic system, and detect a frequently occurring object in the sequence of images. The computer system can then identify this object and represent a set of features detected in the sequence of images as a vector in order to replace the previous stock images, in vector form, with real-time digital photographic images of products frequently occurring across multiple stores.

Furthermore, each template vector in the template image database can also be tagged with a product description, supplier, supply period, graphics release date, secondary graphic, barcode, packaging profile (e.g., shape, size, dimension, geometry, color palette), packaging orientation, and/or other quantitative or qualitative product packaging features or descriptors.

In one implementation, the computer system can: access a stock image database; retrieve a set of stock images—such as a computer drafted photographical or graphical representation of all or a portion of a product or packaging of the product—of the instance of each product from the stock image database; represent each stock image as a multi-dimensional space vector; and populate a template image database with these vectors.

The computer system can then implement methods and techniques described above to replace these stock images with raw digital photographic images, captured by the mobile robotic system, for objects frequently occurring in these images within the template image database (e.g., frequency of occurrence greater than a threshold).

Thus, the computer system can receive stock photos, computer drafted or uploaded by a user, representing packaging of a product and then replace these stock photos with vectorized representations of raw images depicting the product within the template image database.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
    during a first time period:
        accessing a first image, in a set of images, of a first inventory structure captured by a robotic system while navigating within a facility;
        detecting a first slot, in a set of slots, on the first inventory structure, depicted in the first image;

detecting a first product unit occupying the first slot depicted in a first region of the first image;
extracting a first set of visual features from the first region of the first image, the first set of visual features representing the first product unit;
detecting a first tag, proximal the first slot, in a second region of the first image;
identifying a first product identifier of a first product type of the first product unit based on features detected in the second region of the first image;
accessing a visual embedding model defined for the facility and trained to ingest a set of visual features of an image captured by the robotic system and automatically represent the set of visual features in a corresponding vector;
implementing the visual embedding model to represent the first set of visual features in a first template vector, in a set of template vectors, representing the first product unit;
labeling the first template vector with the first product identifier; and
populating a multi-dimensional space with the set of template vectors representing verified products within the facility; and
during a second time period succeeding the first time period:
accessing a second image of a second inventory structure captured by the robotic system;
detecting a second slot on the second inventory structure depicted in the second image;
detecting an object arranged in the second slot of the second inventory structure in the second image;
extracting a second set of visual features from the second image, the second set of visual features representing a packaging profile of the object;
representing the second set of visual features in a vector;
in response to the vector approximating a first cluster of template vectors in the multi-dimensional space, calculating a first similarity score between the second set of visual features represented in the vector and template visual features represented in the first cluster of template vectors; and
in response to the first similarity score exceeding a threshold score:
identifying the object as a product unit of a second product type affiliated with a second product identifier associated with the first cluster of template vectors;
assigning the second product identifier to the vector; and
storing the vector in the multi-dimensional space.

2. The method of claim 1, wherein accessing the first image of the first inventory structure captured by the robotic system comprises accessing the first image of the first inventory structure captured by the robotic system comprising:
a base;
a drive system arranged in the base;
a power supply;
a set of mapping sensors;
a processor configured to transform data collected by the set of mapping sensors into maps of a space surrounding the robotic system;
a mast extending vertically from the base;
a set of cameras arranged on the mast; and
a wireless communication module configured to:
download waypoints and a master map of the facility from a remote computer system;
upload images captured by the set of cameras to the remote computer system; and
upload maps generated by the processor to the remote computer system.

3. The method of claim 1:
further comprising, during a scanning period preceding the first time period, dispatching the robotic system to autonomously navigate through the facility and record images of the inventory structures within the facility; and
wherein accessing the first image of the first inventory structure comprises, at a computer system, receiving the first image of the first inventory structure from the robotic system.

4. The method of claim 1:
further comprising, during the first time period:
based on the first set of visual features and a first variance factor, calculating a second set of visual features representing a first synthetic variation of the first product unit;
representing the second set of visual features in a second template vector in the set of template vectors;
labeling the second template vector with the first product identifier;
based on the first set of visual features and a second variance factor, calculating a third set of visual features representing a second synthetic variation of the first product unit;
representing the third set of visual features in a third template vector in the set of template vectors; and
labeling the third template vector with the first product identifier; and
wherein populating the multi-dimensional space with the set of template vectors comprises populating the multi-dimensional space with the set of template vectors comprising the first template vector, the second template vector, and the third template vector.

5. The method of claim 4:
wherein extracting the first set of visual features comprises extracting the first set of visual features comprising a first packaging profile, a first set of text features, a first relative orientation, and a first lighting condition;
wherein calculating the second set of visual features comprises calculating the second set of visual features comprising the first packaging profile, the first set of text features, the first relative orientation, and a second lighting condition; and
wherein calculating the third set of visual features comprises calculating the third set of visual features comprising the first packaging profile, the first set of text features, a second relative orientation, and a third lighting condition.

6. The method of claim 1, wherein populating the multi-dimensional space with the set of template vectors comprises populating the multi-dimensional space with the set of template vectors comprising:
the first cluster of template vectors associated with the second product identifier of the second product type;
a second cluster of template vectors associated with the first product identifier of the first product type; and
a third cluster of template vectors associated with a third product identifier of a third product type.

7. The method of claim 1, further comprising, in response to the first similarity score falling below the threshold score:
  rejecting the second product identifier for assignment to the vector;
  in response to the vector approximating a second cluster of template vectors in the multi-dimensional space, calculating a second similarity score between the second set of visual features represented in the vector and template visual features represented in the second cluster of template vectors; and
  in response to the second similarity score exceeding the threshold score:
    identifying the object as a product unit of the first product type affiliated with the first product identifier associated with the second cluster of template vectors;
    assigning the first product identifier to the vector; and
    storing the vector in the multi-dimensional space.

8. The method of claim 1:
  wherein calculating the first similarity score between the second set of visual features represented in the vector and template visual features represented in the first cluster of template vectors in response to the vector approximating the first cluster of template vectors in the multi-dimensional space comprises calculating the first similarity score between the second set of visual features represented in the vector and template visual features represented in the first cluster of template vectors in response to the vector approximating the first cluster of template vectors in the multi-dimensional space, the first cluster of template vectors comprising:
    a first subset of template vectors affiliated with the second product identifier and representing visual features of product units of the second product type located within the facility; and
    a second subset of template vectors affiliated with the second product identifier and representing visual features of product units of the second product type and located in locations external the facility;
  wherein storing the vector in the multi-dimensional space comprises storing the vector in the multi-dimensional space, the vector labelled with the second product identifier and representing the second set of visual features of the product unit located within the facility; and
  further comprising, in response to storing the vector in the multi-dimensional space and in response to a quantity of template vectors in the first subset of template vectors exceeding a threshold quantity, removing the second subset of template vectors from the multi-dimensional space.

9. The method of claim 8, further comprising, in response to storing the vector in the multi-dimensional space and in response to the quantity of template vectors in the first subset of template vectors falling below the threshold quantity:
  assigning a first weight to template vectors in the first subset of template vectors in the first cluster of template vectors; and
  assigning a second weight to template vectors in the second subset of template vectors in the first cluster of template vectors, the second weight less than the first weight.

10. The method of claim 1, further comprising:
  in response to the vector differing from each cluster of template vectors in the multi-dimensional space:
    generating a prompt to upload a stock image of current product packaging for the first object and confirm a product type of the first object; and
    transmitting the prompt to a computing device accessed by a user affiliated with the facility; and
  in response to receiving the stock image of current product packaging for the first object:
    extracting a third set of visual features from the stock image, the third set of visual features representing current product packaging of the object in the stock image;
    representing the third set of visual features in a second template vector;
    labeling the second template vector with a third product identifier of a third product type specified by the user; and
    populating the multi-dimensional space with the second template vector.

11. The method of claim 1, further comprising:
  in response to the first similarity score falling below the threshold score and exceeding a lower threshold score:
    predicting the object as the product unit of the second product type affiliated with the second product identifier associated with the first cluster of template vectors;
    assigning the second product identifier to the vector;
    generating a prompt to upload a stock image of current product packaging for the first object; and
    transmitting the prompt to a computing device accessed by a user affiliated with the facility; and
  in response to receiving the stock image of current product packaging for the first object:
    extracting a third set of visual features from the stock image, the third set of visual features representing current product packaging of the object in the stock image;
    representing the third set of visual features in a second template vector;
    labeling the second template vector with the second product identifier; and
    populating the multi-dimensional space with the second template vector.

12. The method of claim 1:
  further comprising, during the first time period:
    accessing a second image, in the set of images, of a second inventory structure captured by the robotic system while navigating within the facility;
    detecting a second slot, in the set of slots, on the second inventory structure, depicted in the second image;
    detecting a second product unit occupying the second slot depicted in a second region of the second image;
    extracting a third set of visual features from the second region of the second image, the third set of visual features representing the second product unit;
    detecting a second tag, proximal the second slot, in a third region of the second image;
    identifying the second product identifier of the second product type of the second product unit based on features detected in the third region of the second image;
    representing the third set of visual features in a second template vector in the set of template vectors; and
    labeling the second template vector with the second product identifier; and wherein populating the multi-dimensional space with the set of template vectors comprises populating the multi-dimensional space with the set of template vectors comprising:
  the first template vector representing the first product unit of the first product type; and
  the second template vector representing the second product unit of the second product type.

13. The method of claim 1:
wherein extracting the first set of visual features from the first region of the first image comprises extracting the first set of visual features from the first region of the first image, the first set of visual features representing a first packaging profile of the first product unit and comprising a first geometry, a first color palette, a first set of text features, a first relative orientation, and a first lighting condition; and
wherein extracting the second set of visual features from the first region of the first image comprises extracting the first set of visual features from the first region of the first image, the first set of visual features representing the packaging profile of the object and comprising a second geometry, a second color palette, a second set of text features.

14. The method of claim 1, further comprising:
detecting a second tag, proximal the second slot, in a region of the second image;
identifying a third product identifier of a third product type advertised by the second tag based on features detected in the region of the second image; and
in response to the first similarity score exceeding the threshold score and identifying the object as a product unit of the second product type:
  flagging the second slot for a stocking discrepancy between the second tag, advertising the third product type, and the product unit of the second product type;
  generating a notification indicating the stocking discrepancy;
  transmitting the notification to an associate affiliated with the facility; and
  labelling the vector with the second product identifier of the second product type.

* * * * *